J. T. HOWIESON.
CALCULATING MACHINE.
APPLICATION FILED DEC. 6, 1907. RENEWED NOV. 21, 1911.
1,030,470.
Patented June 25, 1912.
23 SHEETS—SHEET 4.
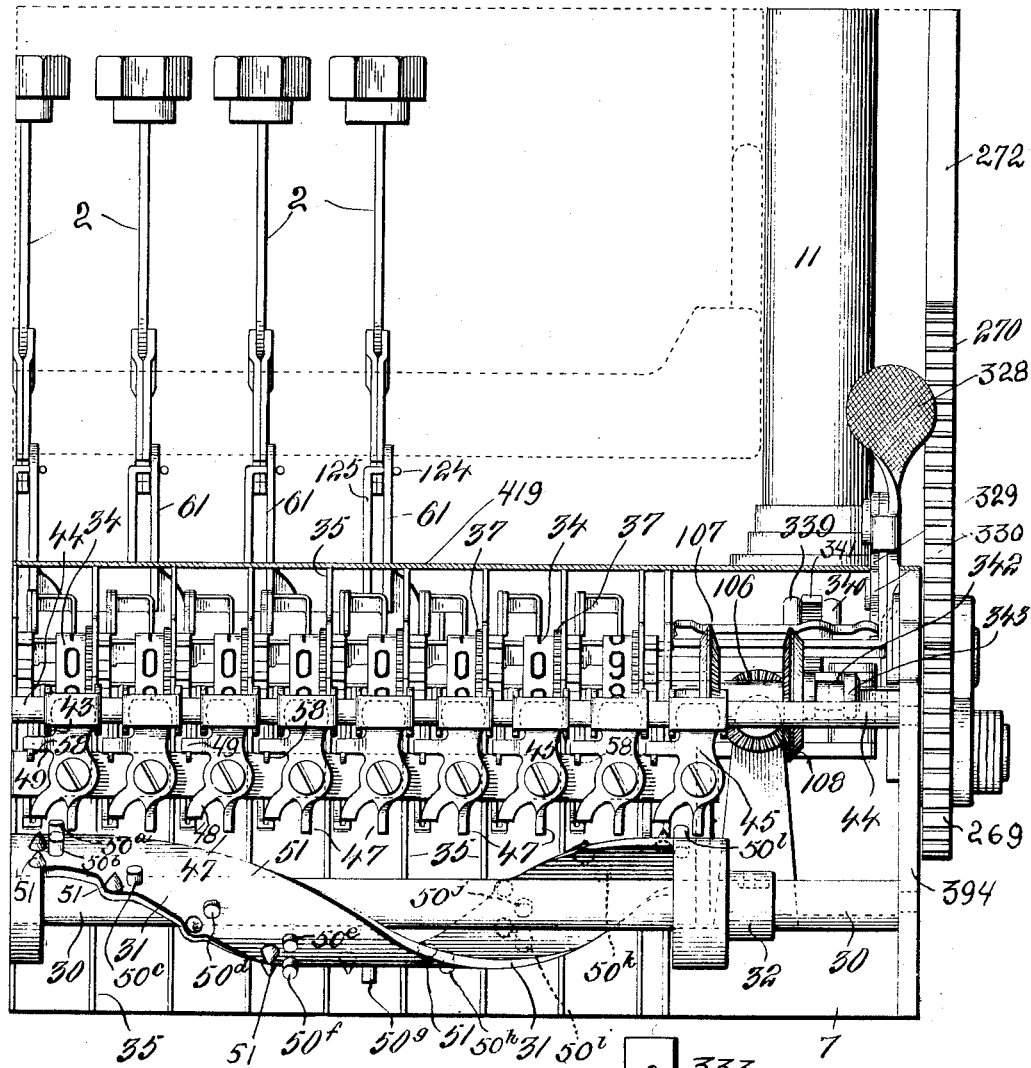
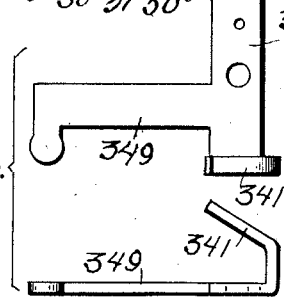
INVENTOR
JOHN T. HOWIESON,
Attorney

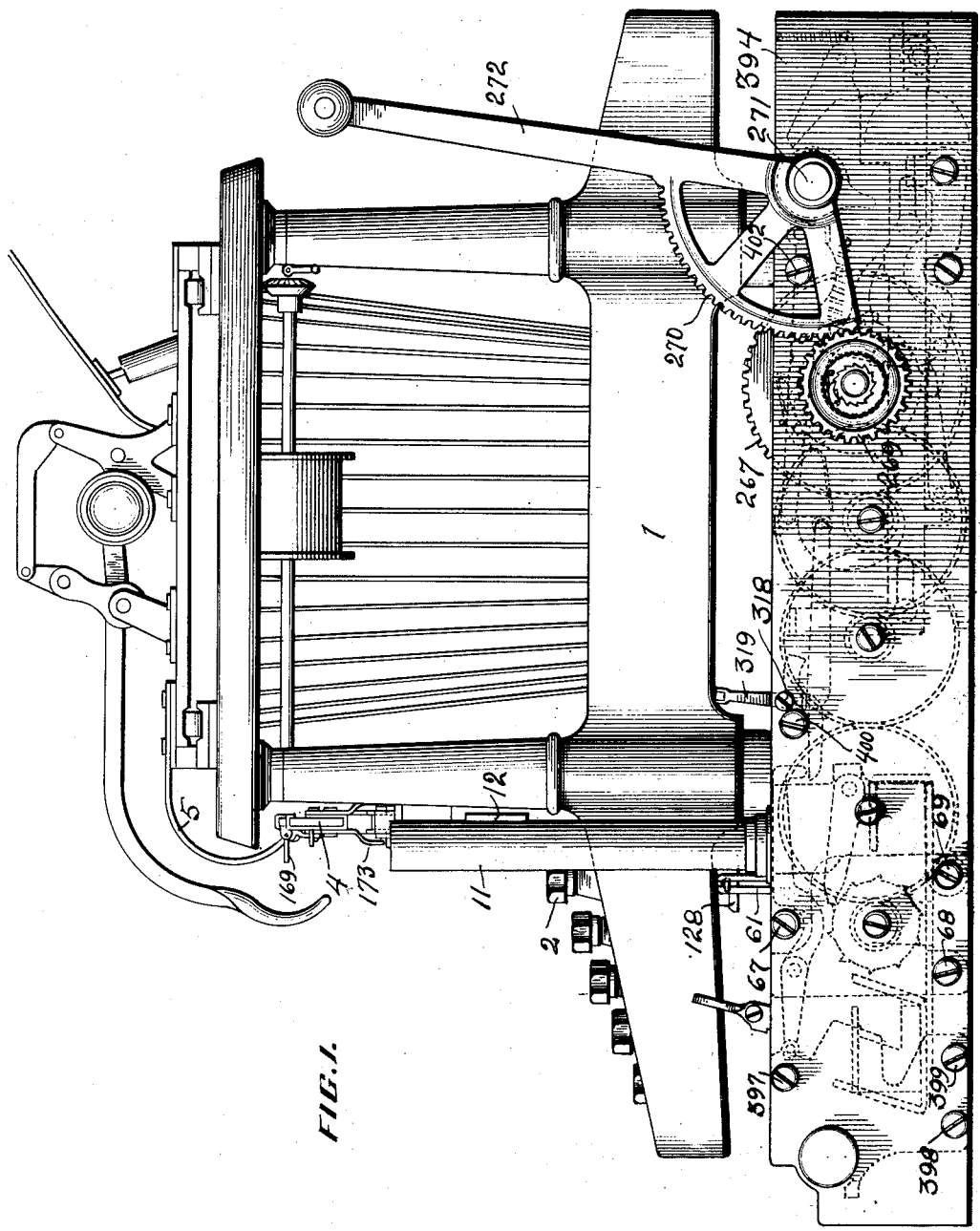

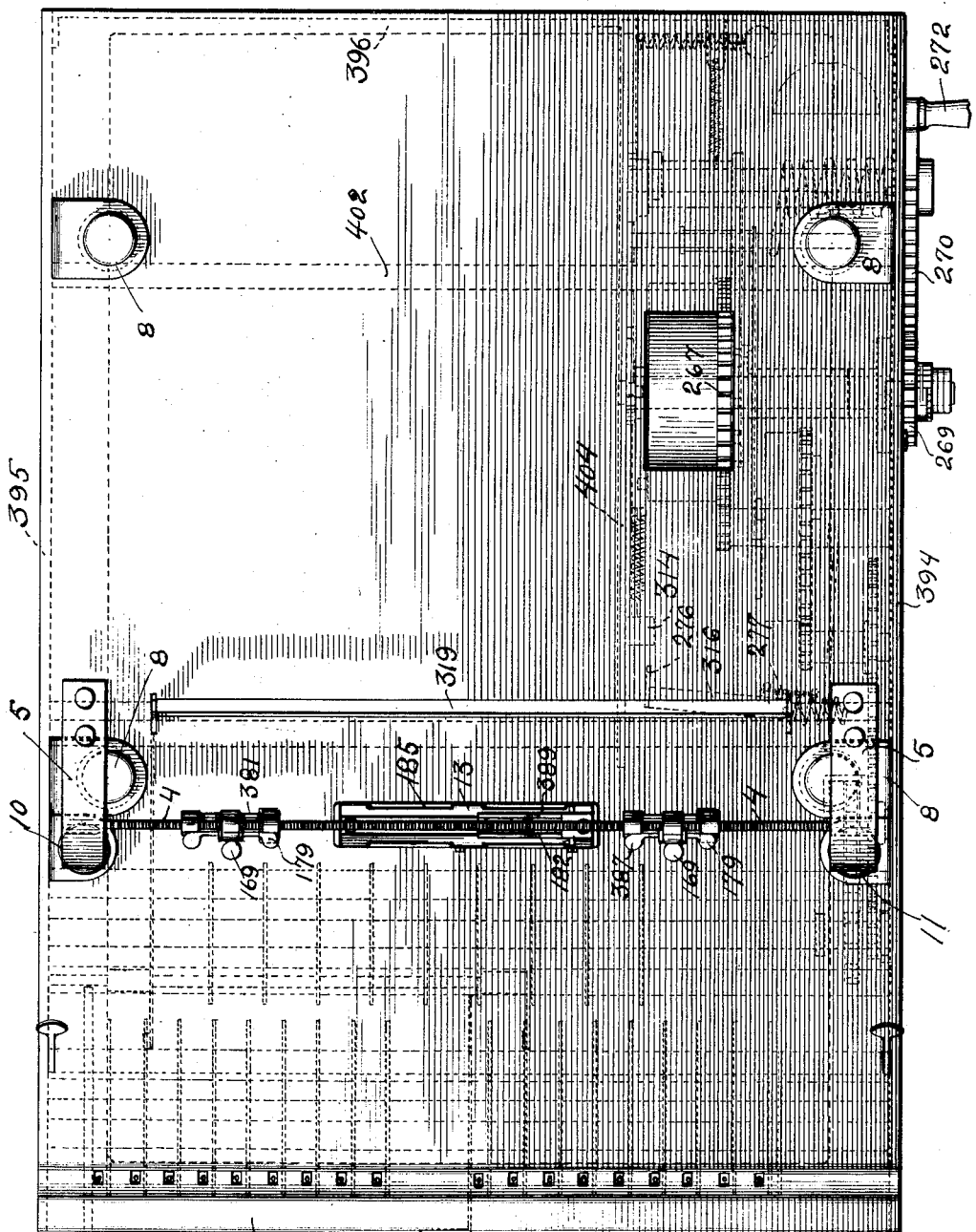

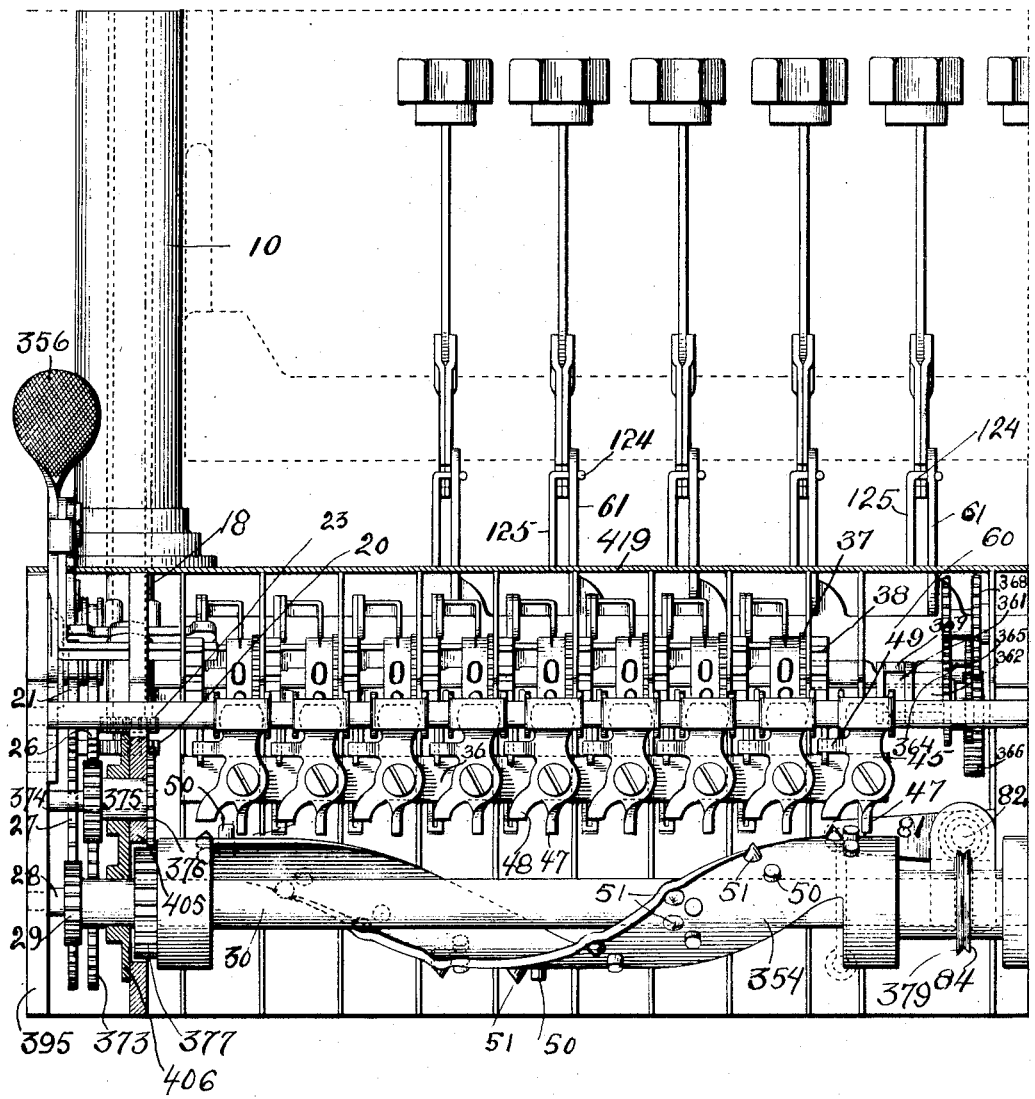

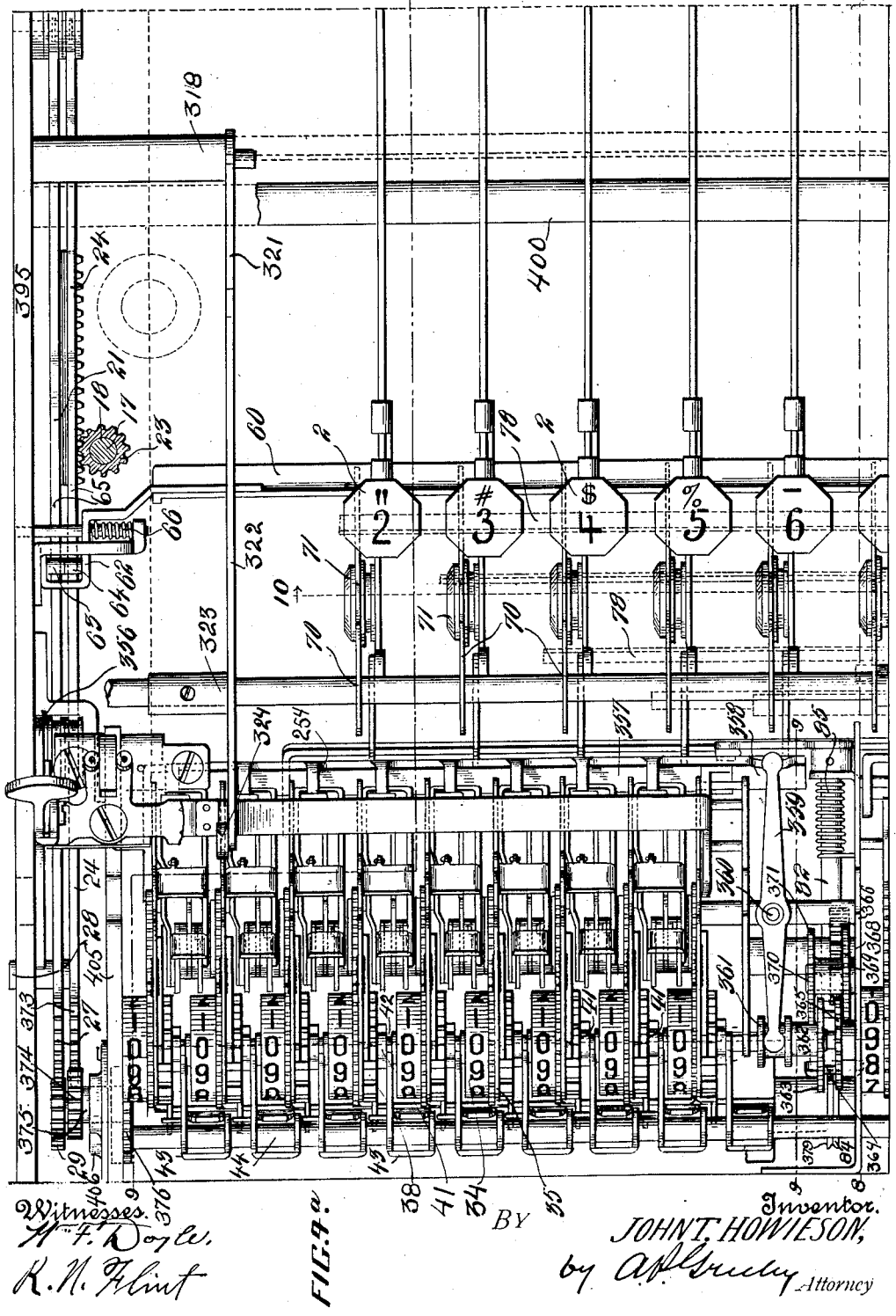

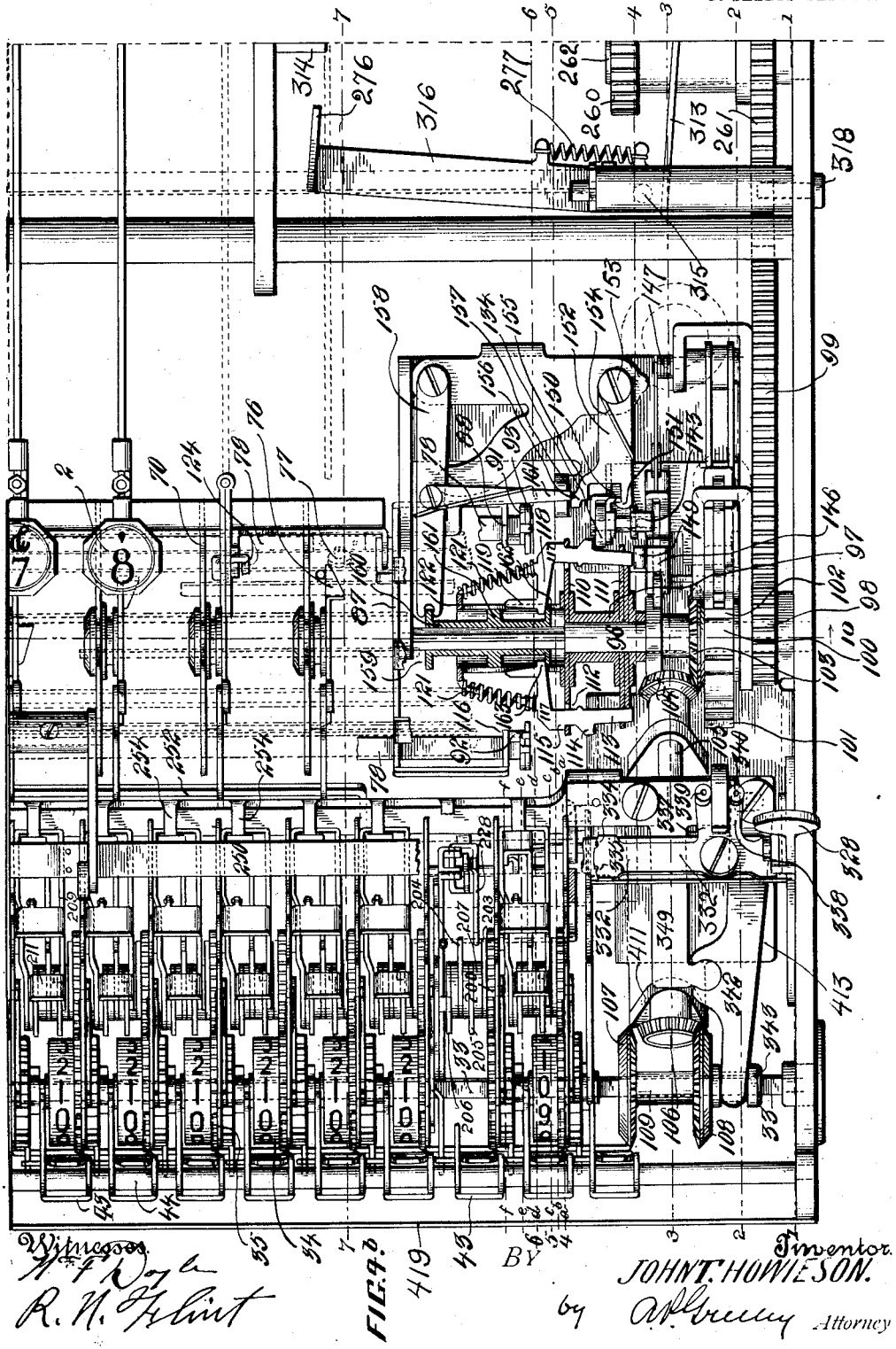

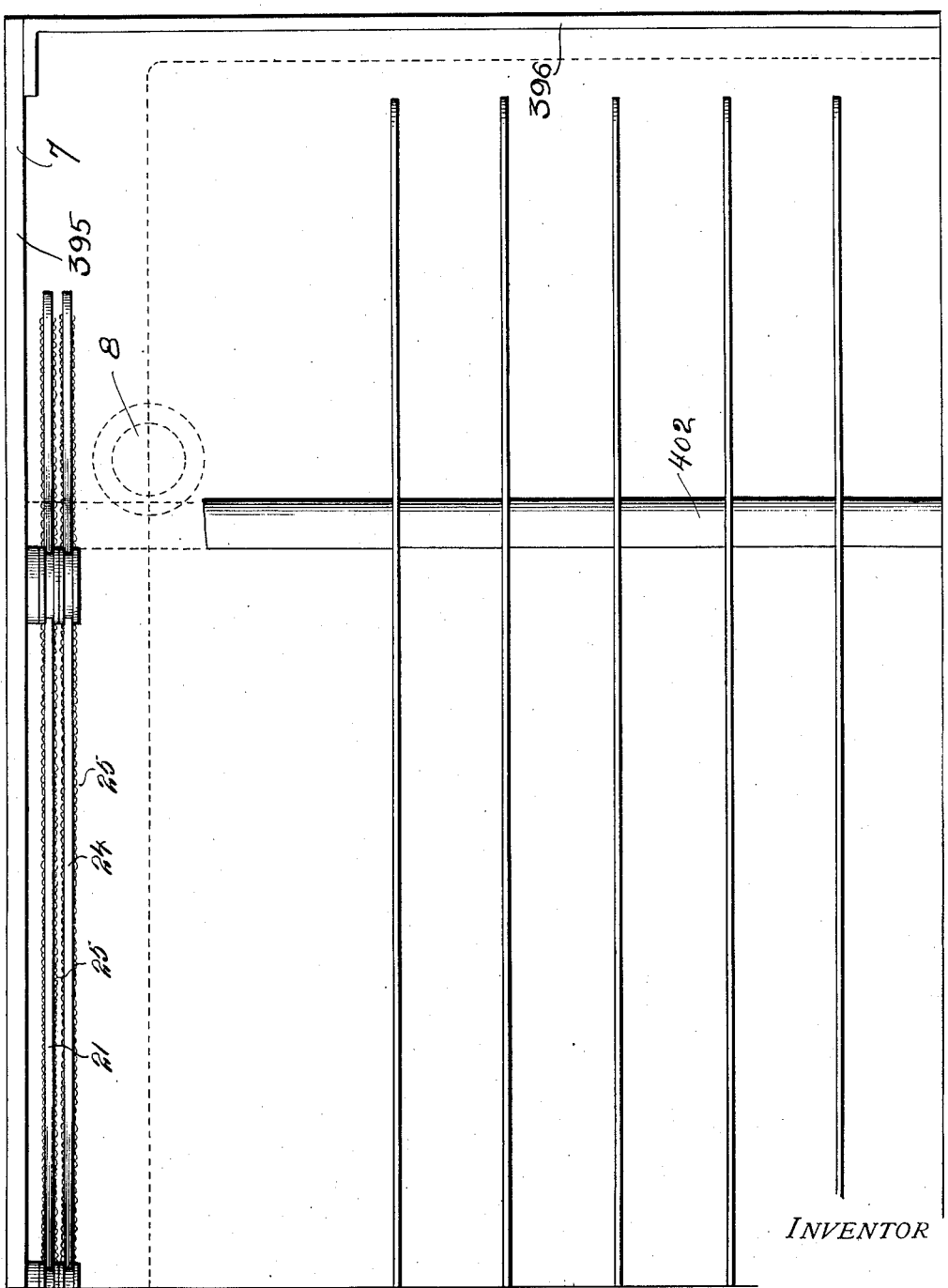

J. T. HOWIESON.
CALCULATING MACHINE.
APPLICATION FILED DEC. 6, 1907. RENEWED NOV. 21, 1911.
1,030,470.
Patented June 25, 1912.
23 SHEETS—SHEET 8.
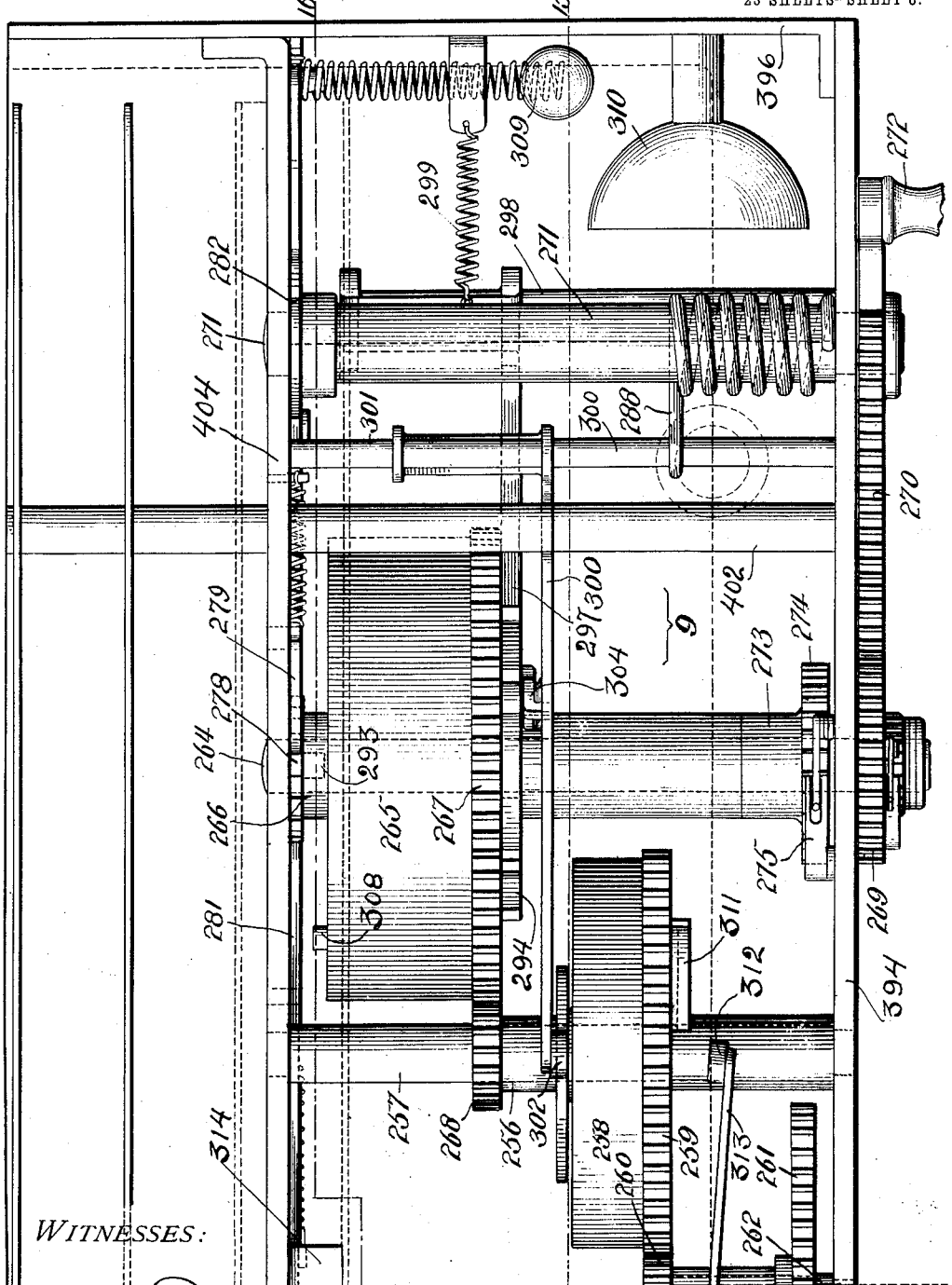

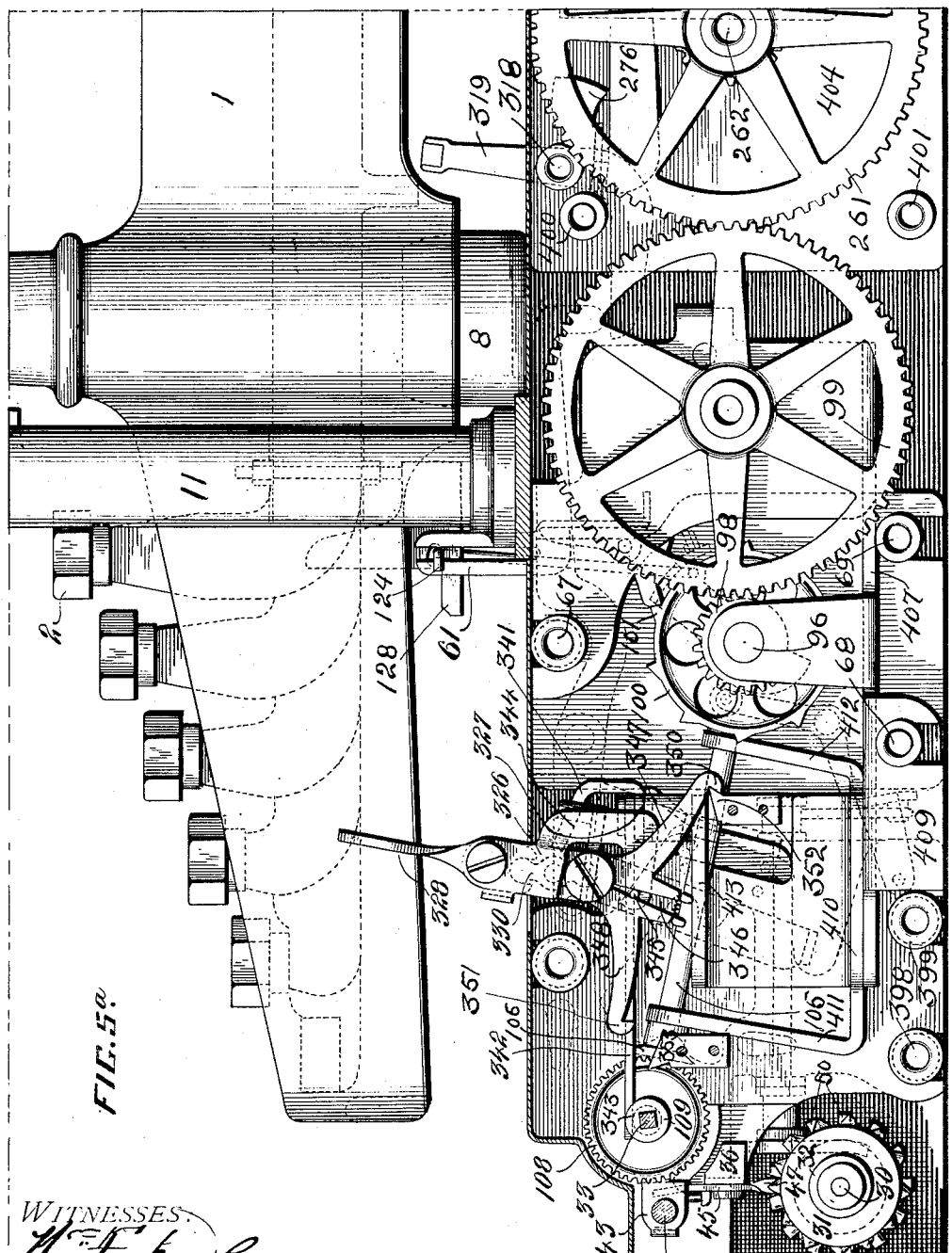
J. T. HOWIESON.
CALCULATING MACHINE.
APPLICATION FILED DEC. 6, 1907. RENEWED NOV. 21, 1911.
1,030,470.
Patented June 25, 1912.
23 SHEETS—SHEET 9.

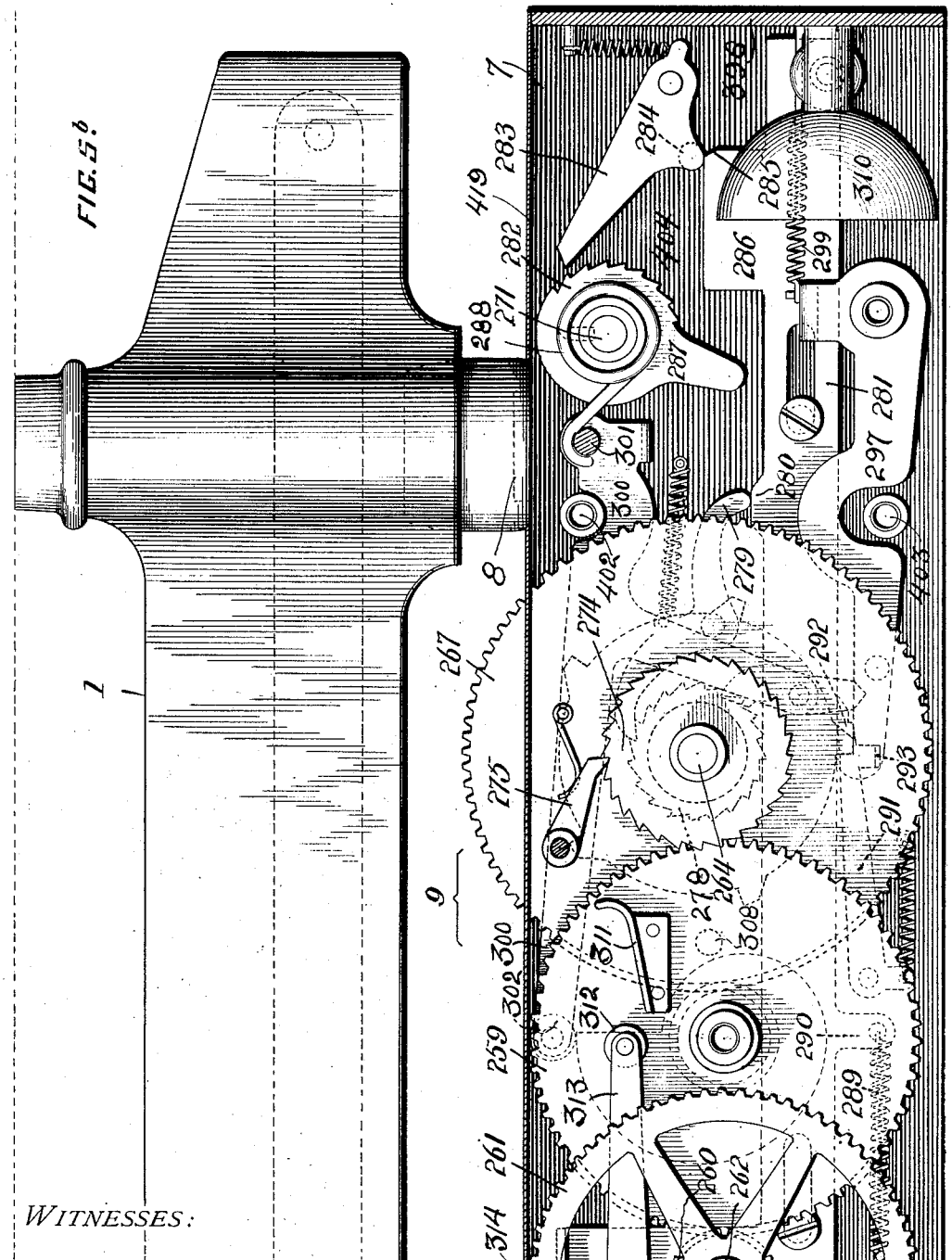

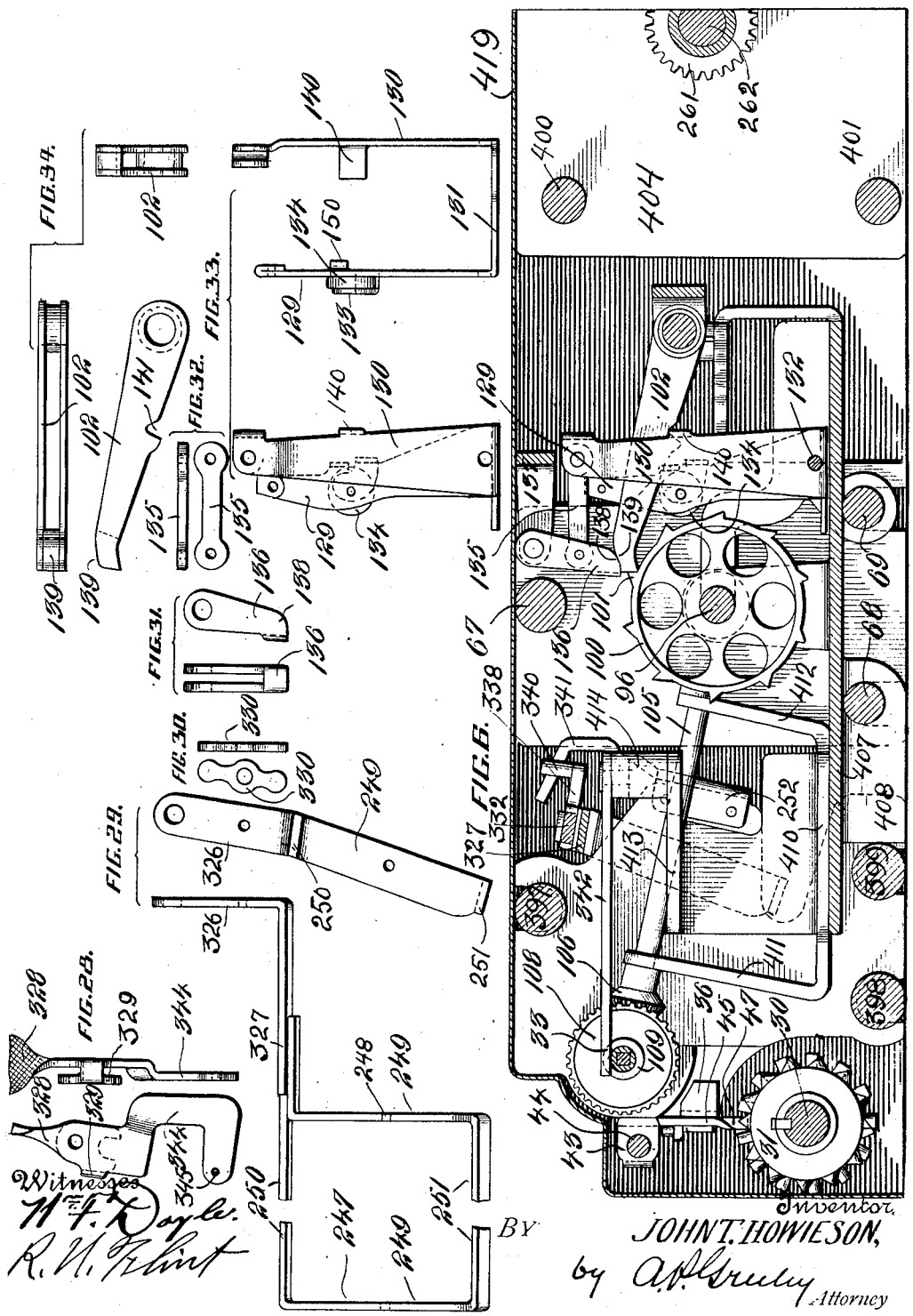

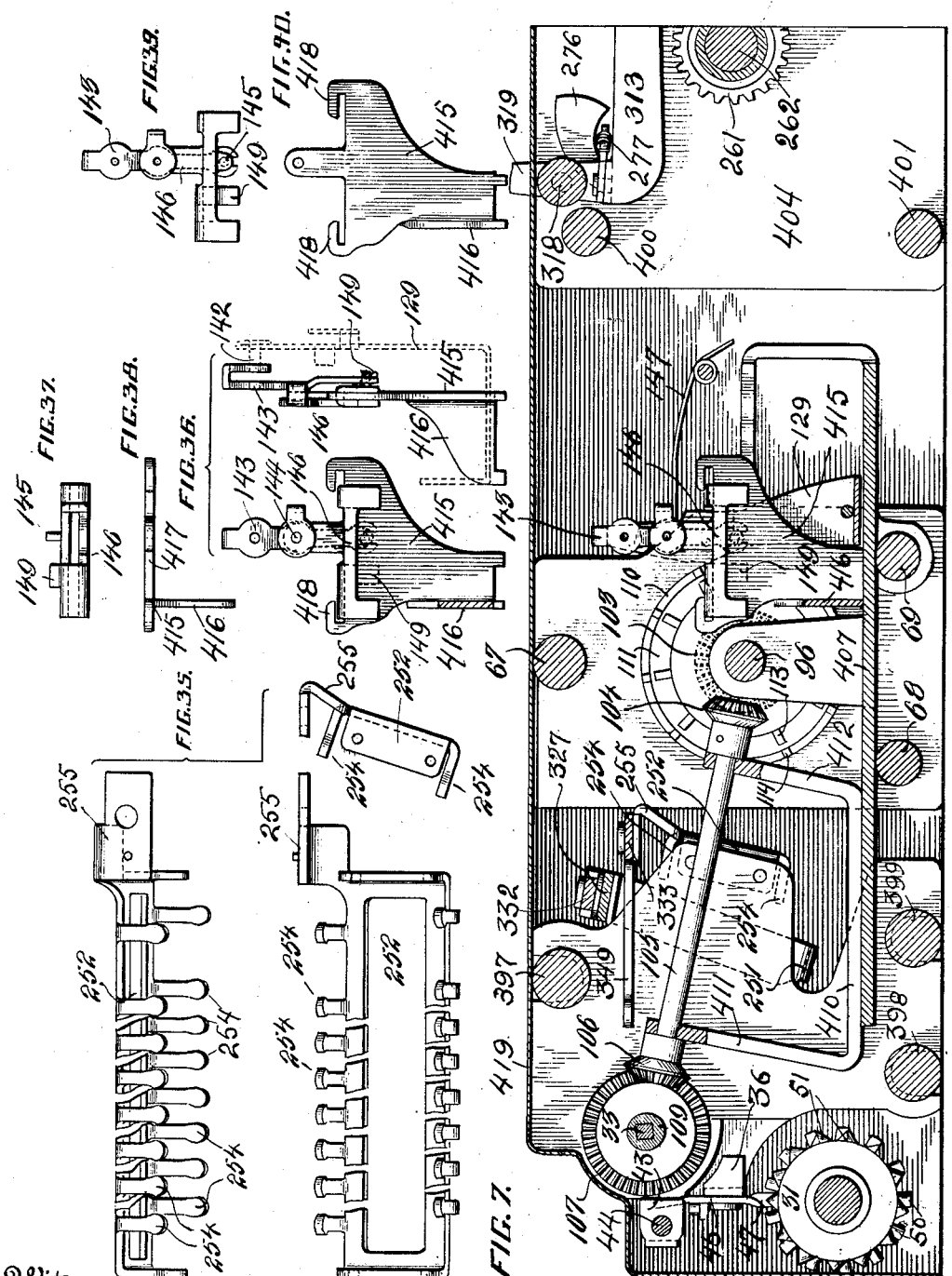

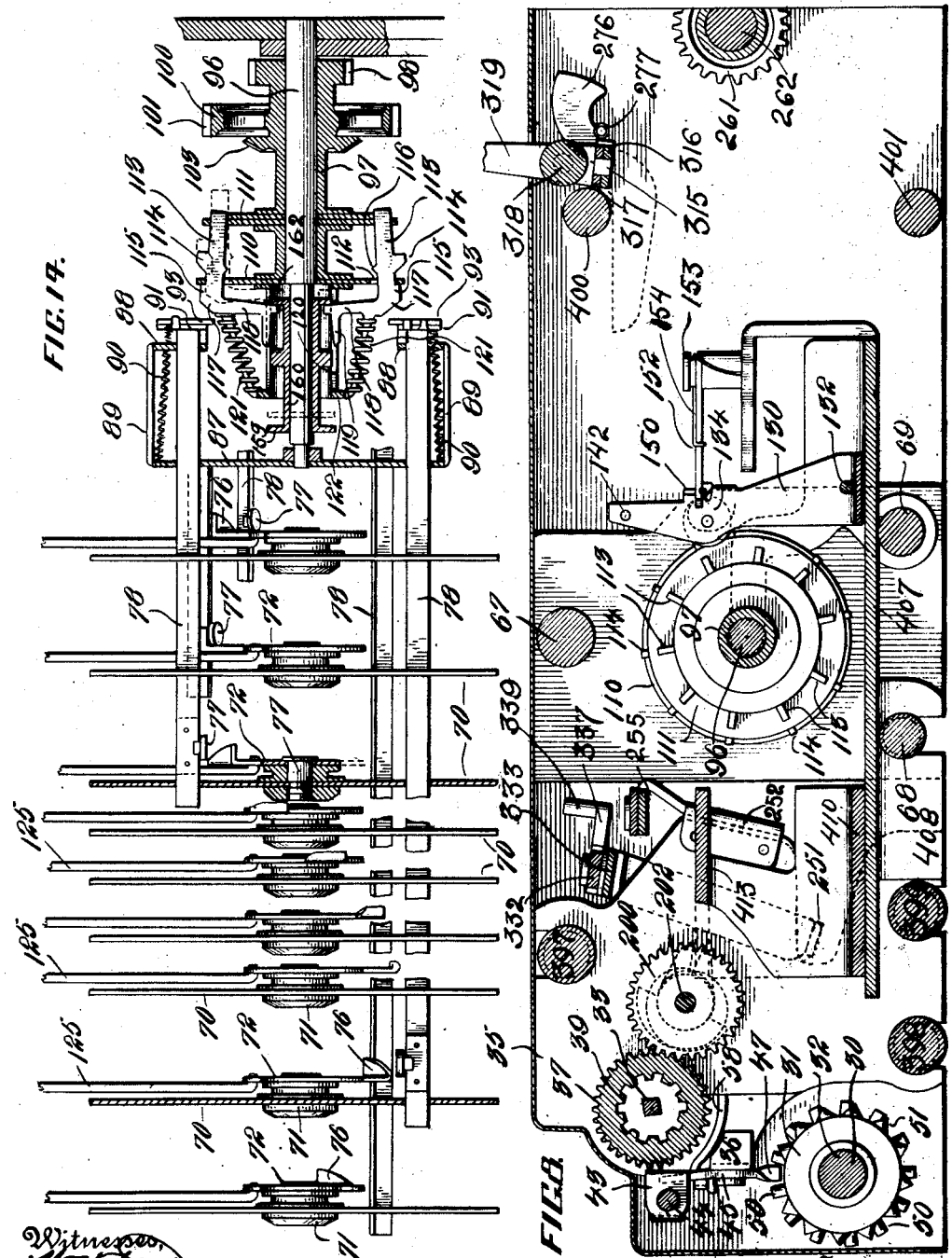

J. T. HOWIESON.
CALCULATING MACHINE.
APPLICATION FILED DEC. 6, 1907. RENEWED NOV. 21, 1911.
1,030,470.
Patented June 25, 1912.
23 SHEETS—SHEET 14.
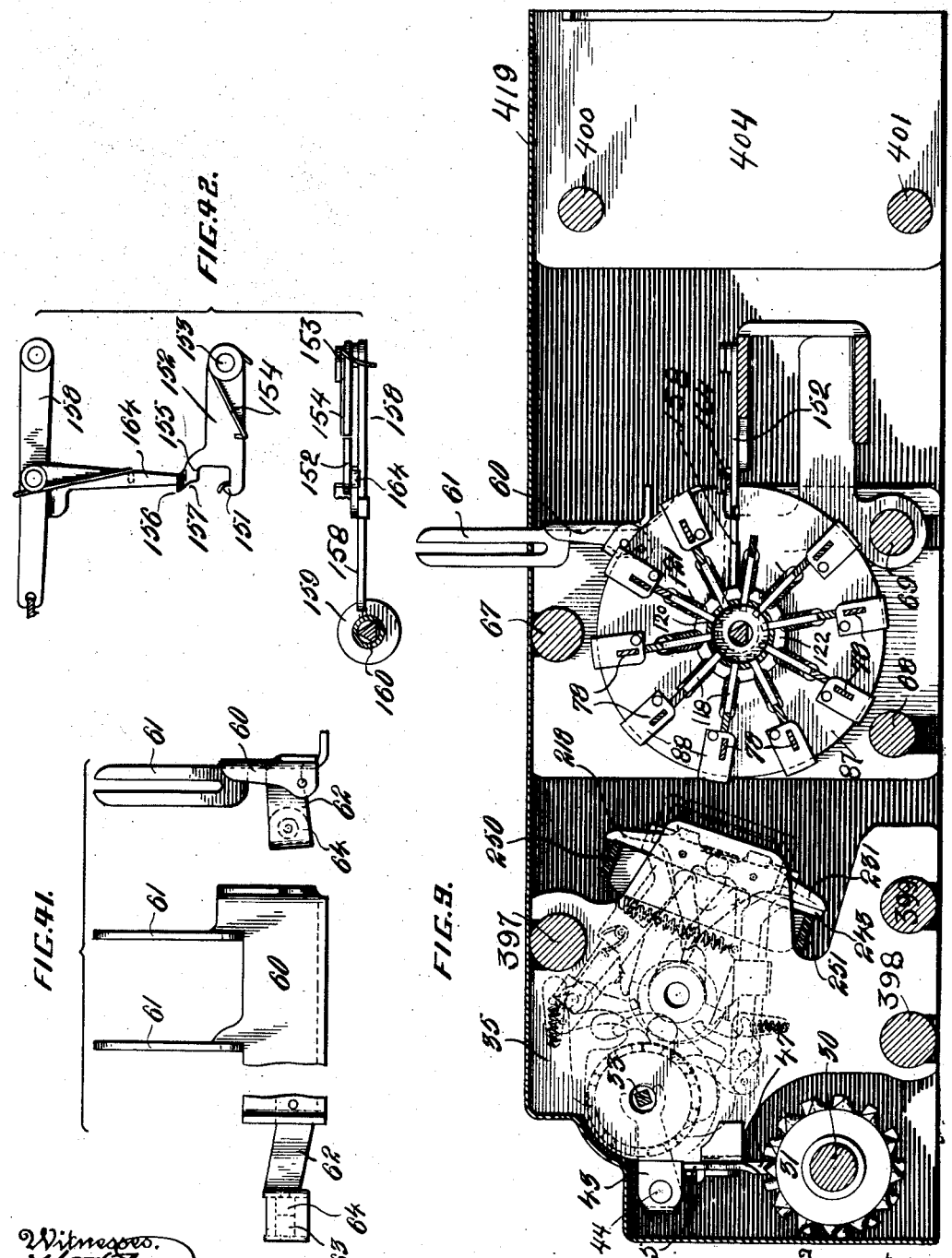

J. T. HOWIESON.
CALCULATING MACHINE.
APPLICATION FILED DEC. 6, 1907. RENEWED NOV. 21, 1911.
1,030,470.
Patented June 25, 1912.
23 SHEETS—SHEET 15.
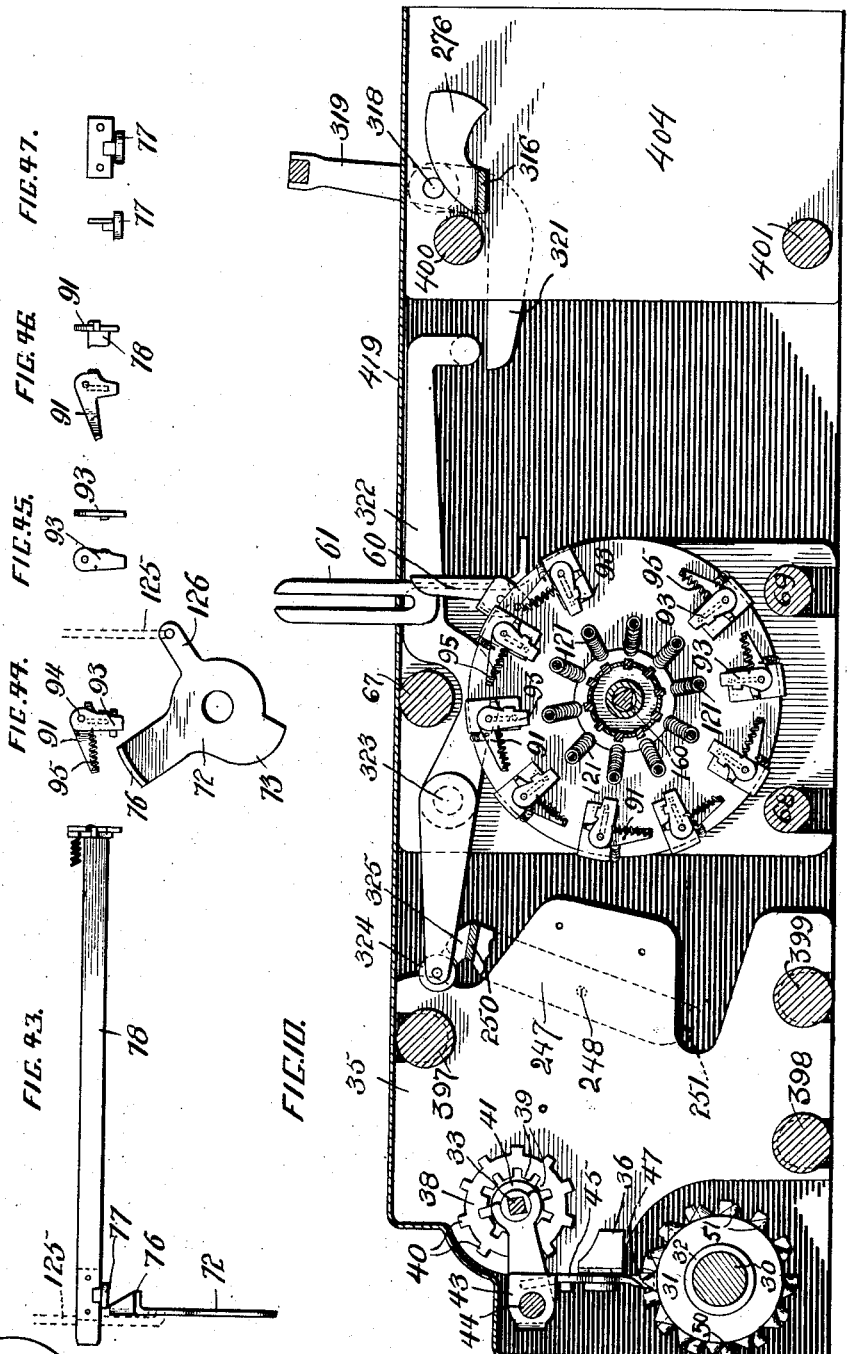

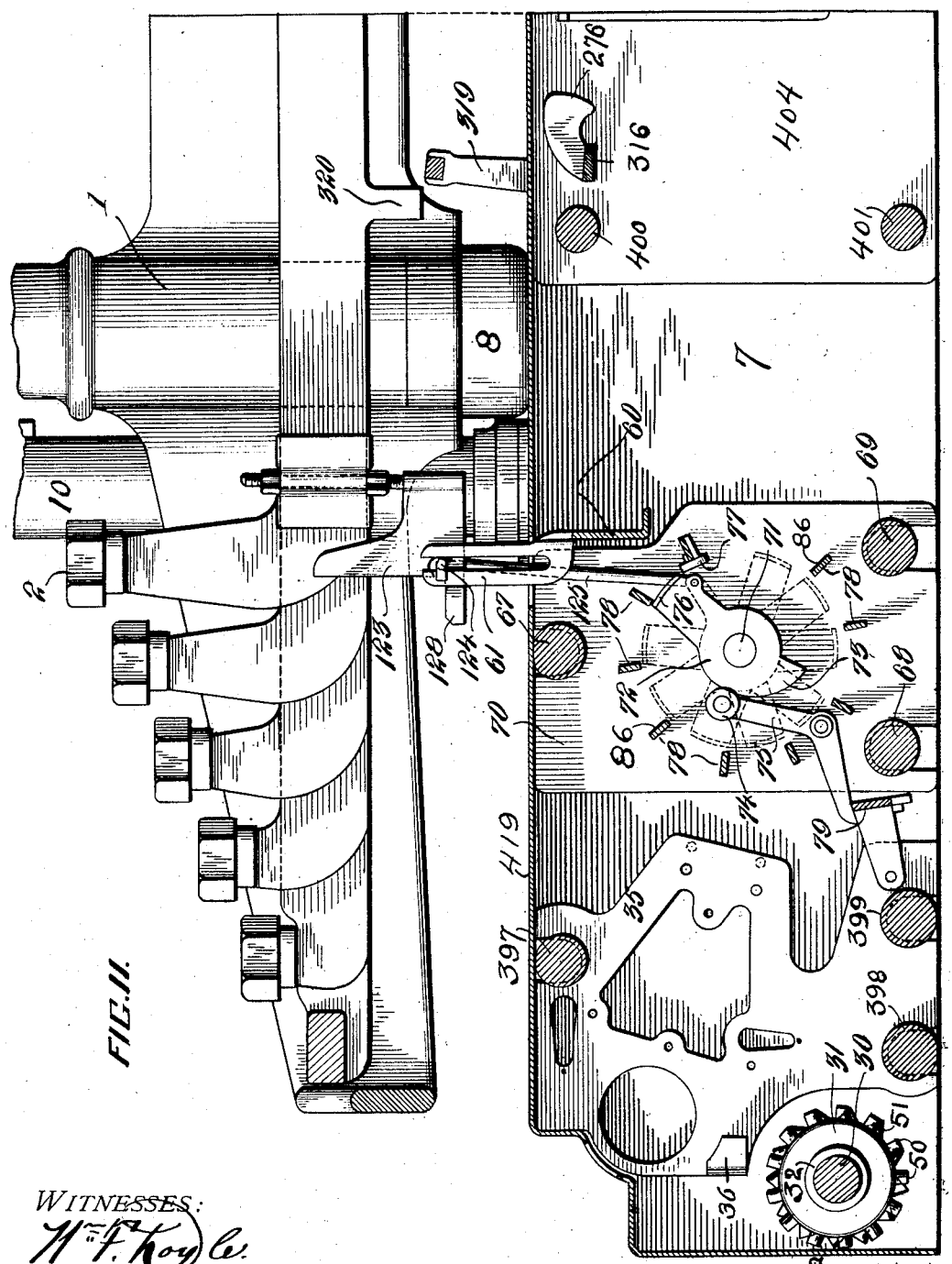

J. T. HOWIESON.
CALCULATING MACHINE.
APPLICATION FILED DEC. 6, 1907. RENEWED NOV. 21, 1911.
1,030,470.
Patented June 25, 1912.
23 SHEETS—SHEET 17.
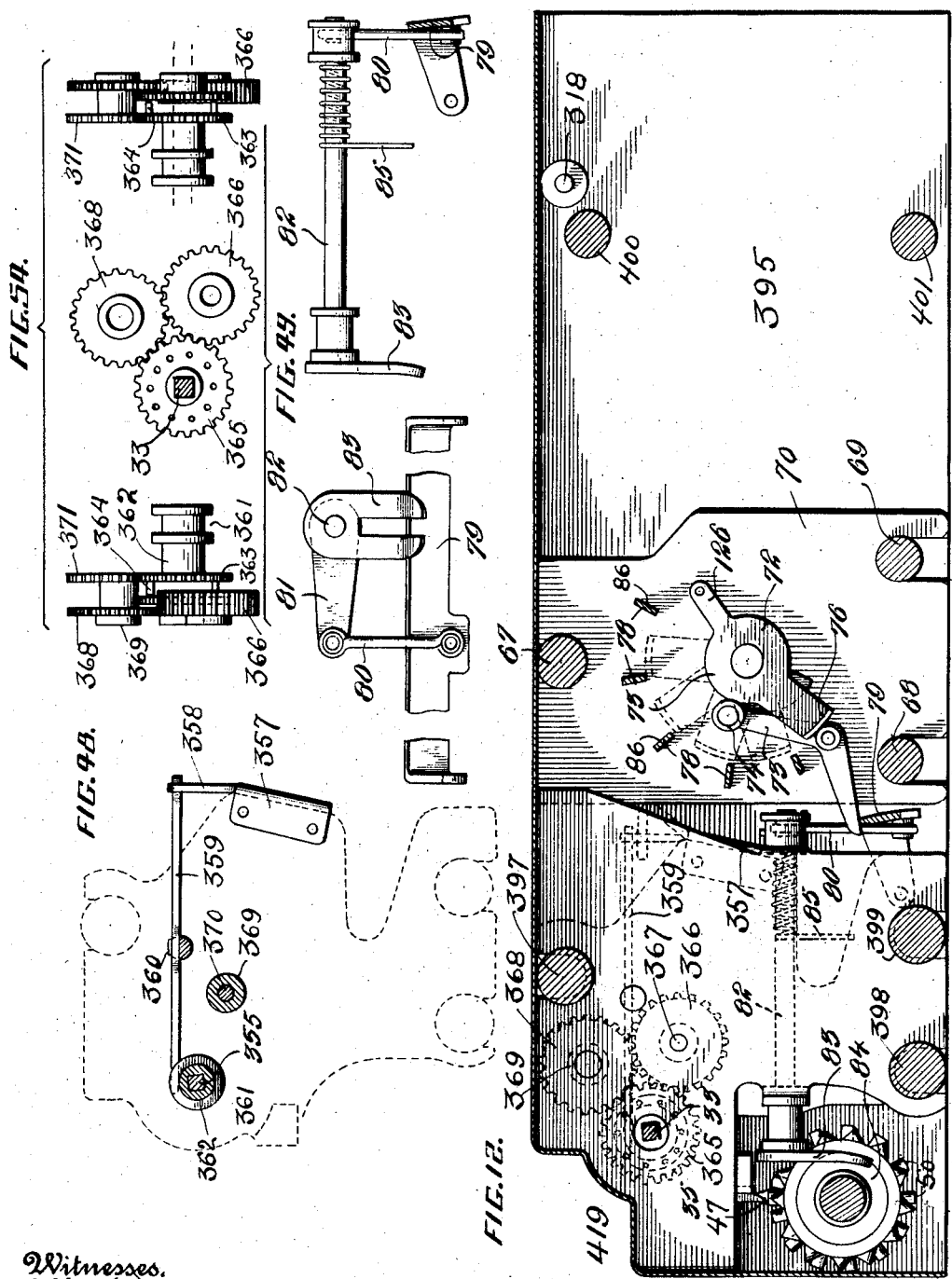
Witnesses.
BY
Inventor.
JOHN T. HOWIESON,
by A. P. Greely, Attorney

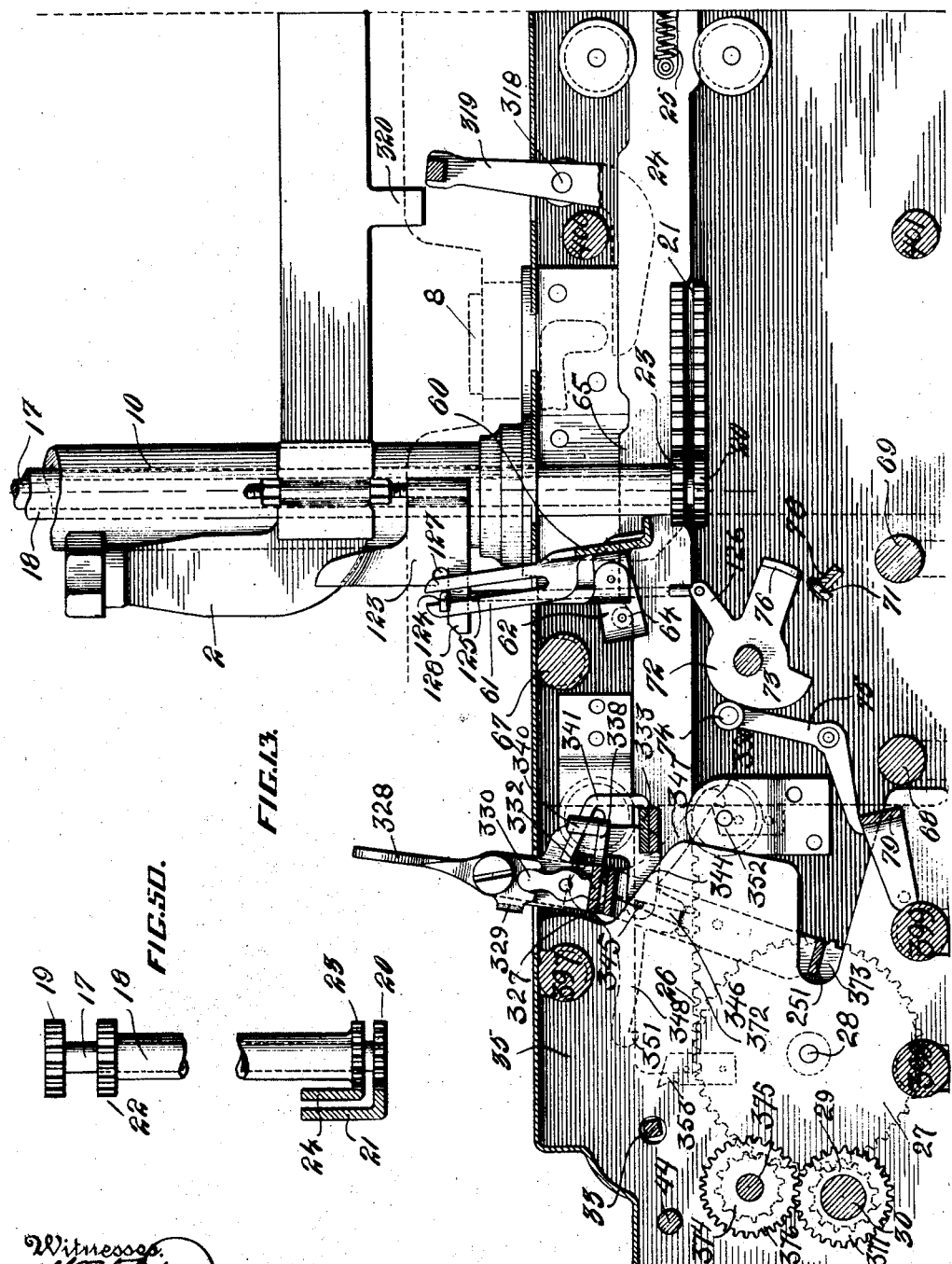

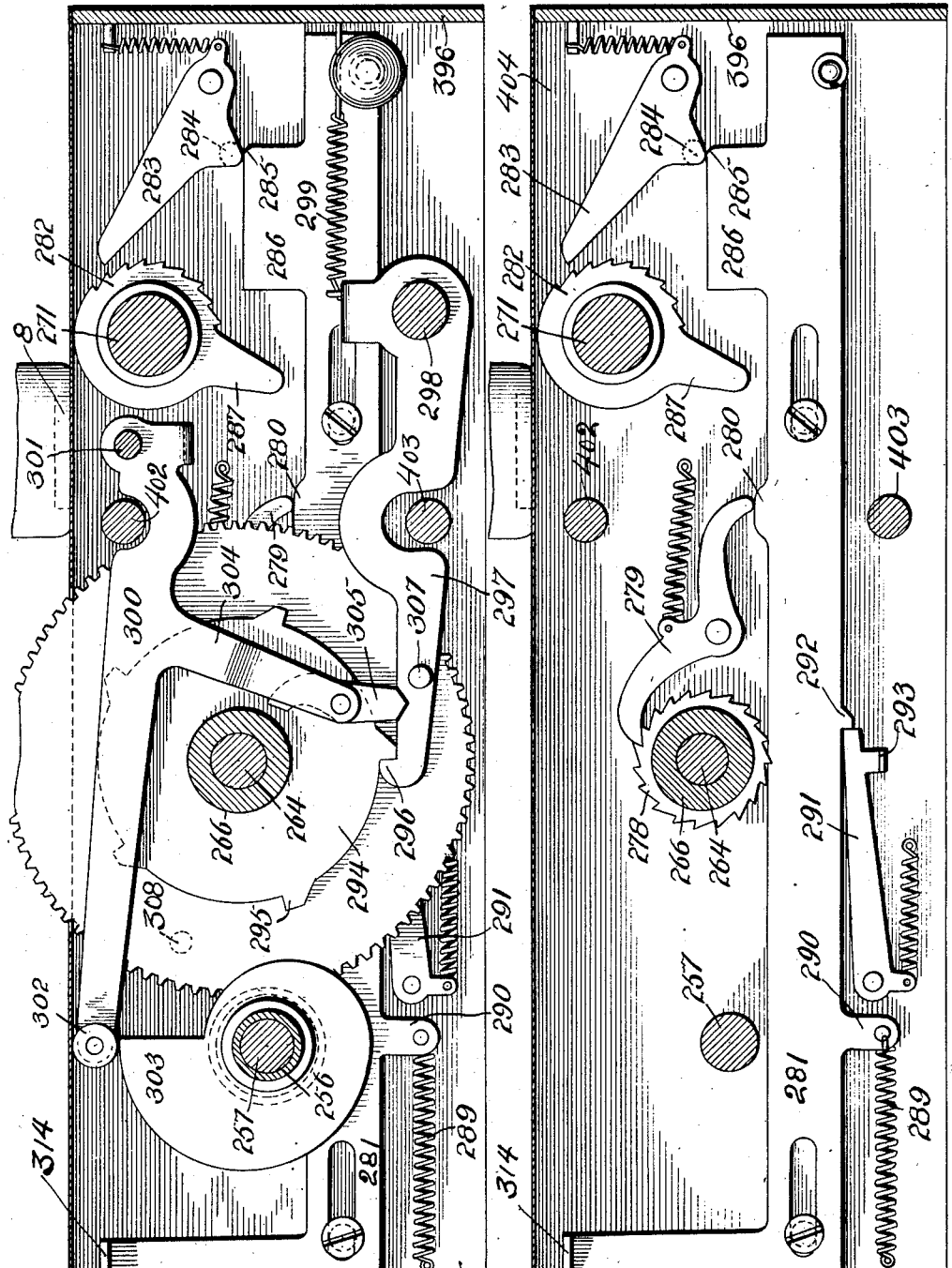

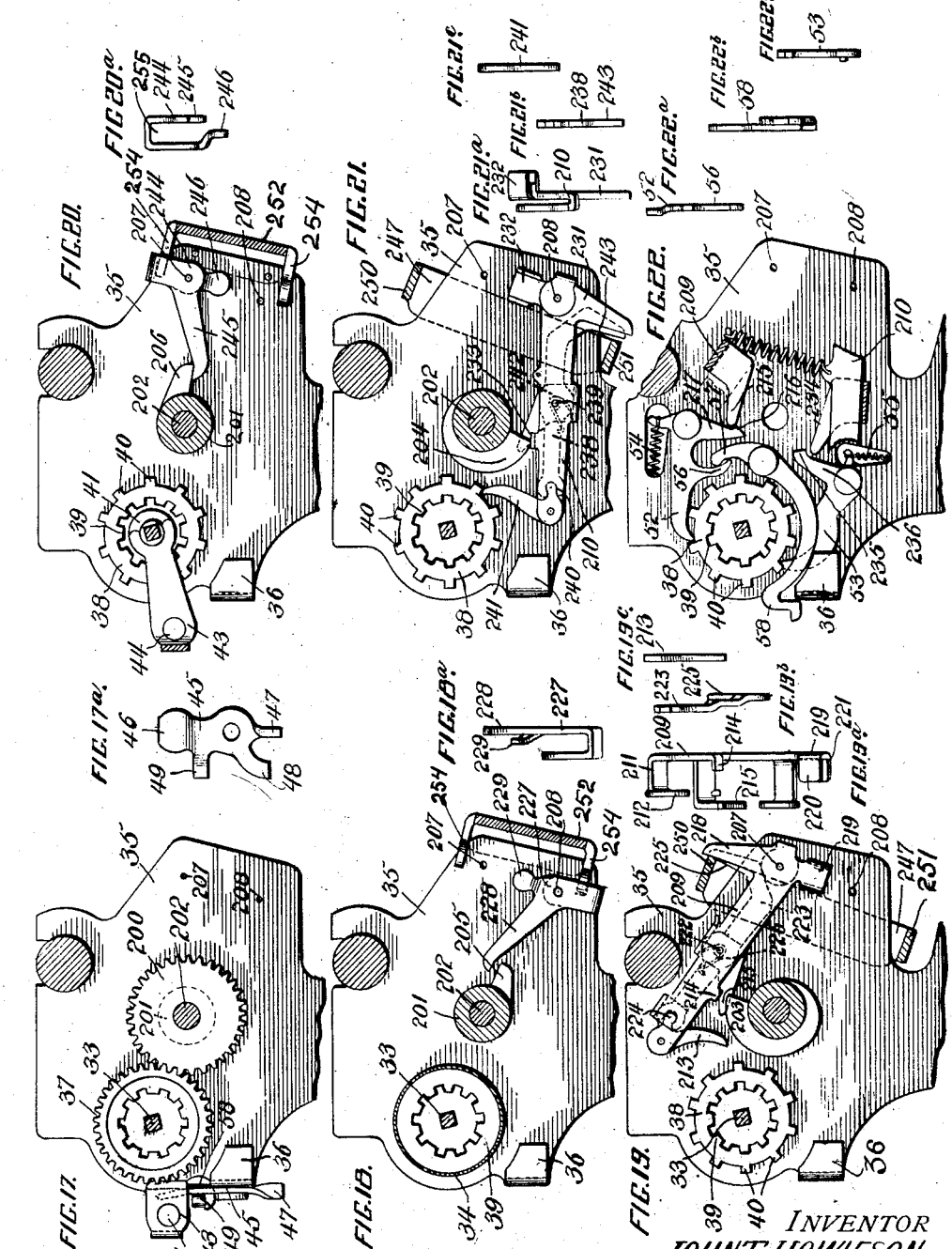

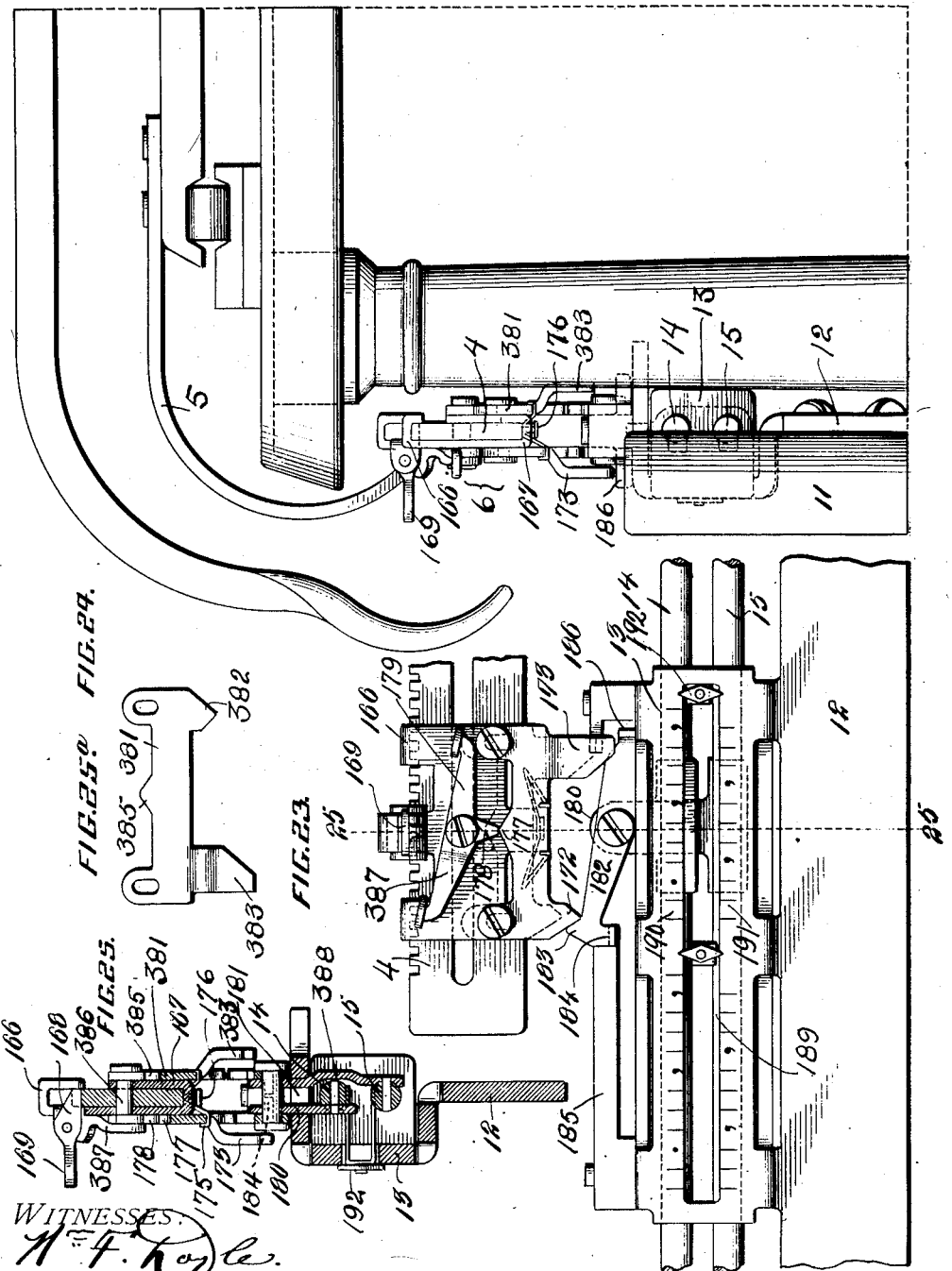

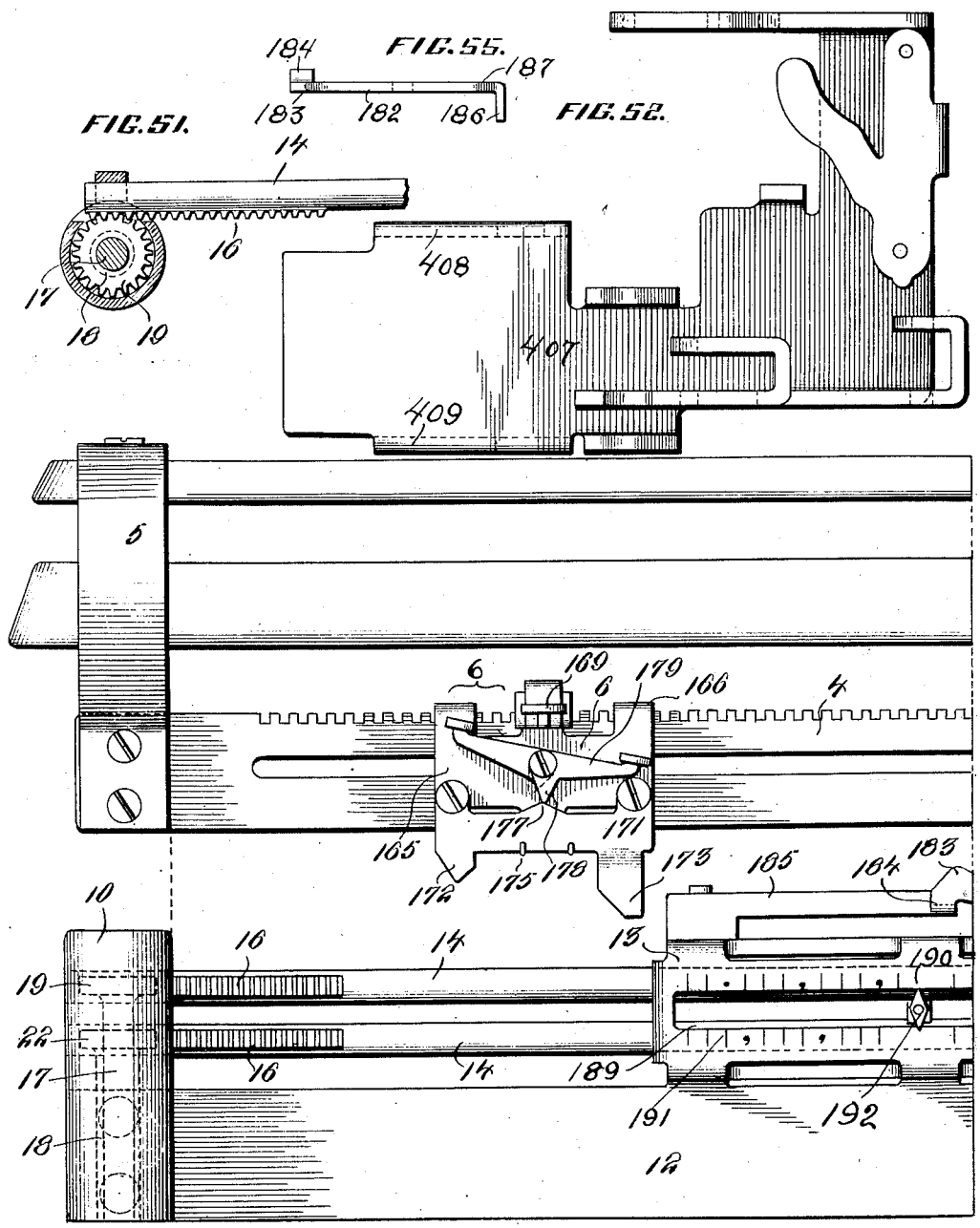

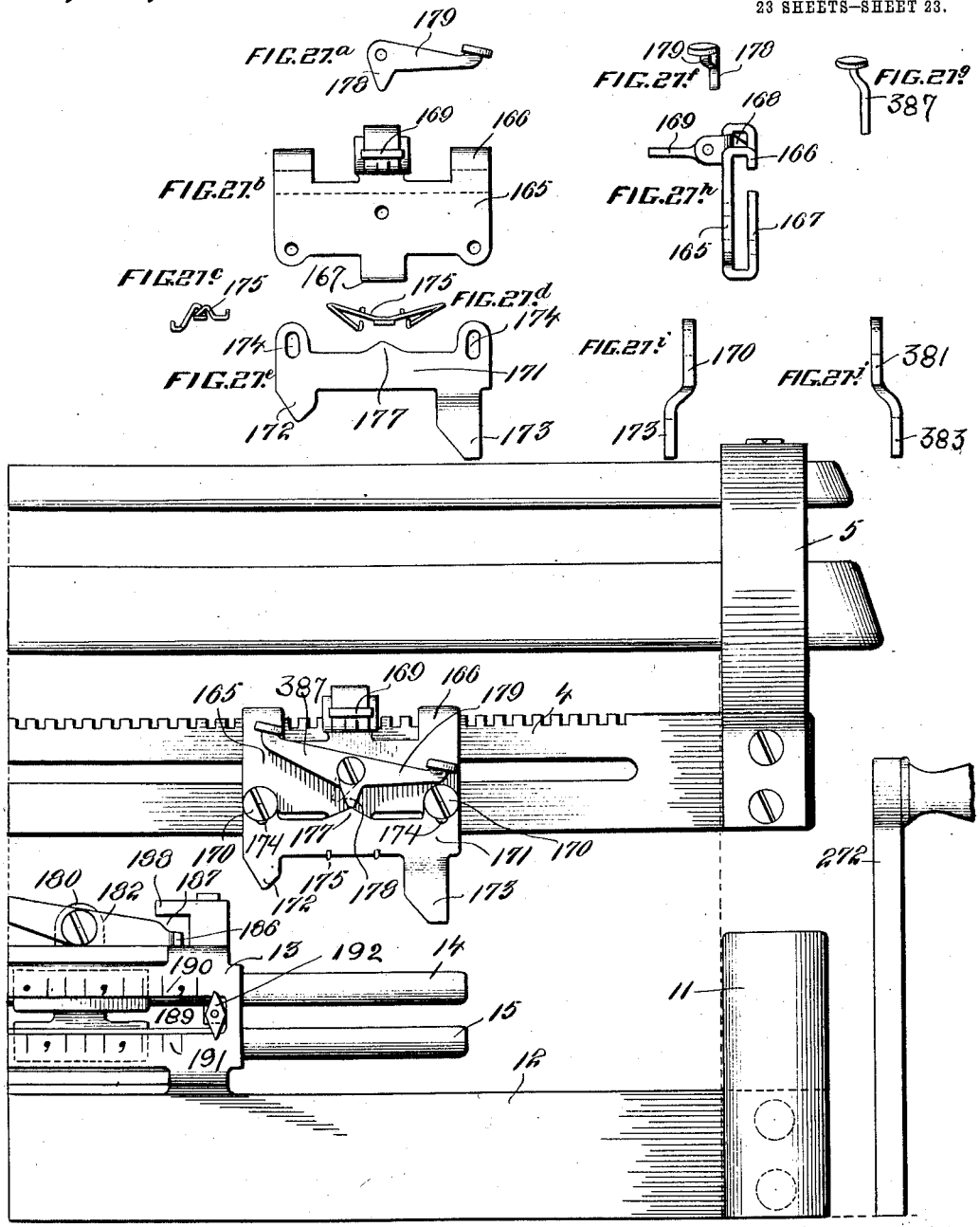

UNITED STATES PATENT OFFICE.

JOHN T. HOWIESON, OF NEW YORK, N. Y.

CALCULATING-MACHINE.

1,030,470.	Specification of Letters Patent.	Patented June 25, 1912.

Application filed December 6, 1907, Serial No. 405,389. Renewed November 21, 1911. Serial No. 661,615.

*To all whom it may concern:*

Be it known that I, JOHN T. HOWIESON, a citizen of the United States, residing at New York, in the county of New York, State of New York, have invented certain new and useful Improvements in Calculating-Machines, of which the following is a description, reference being had to the accompanying drawings, forming a part hereof.

My invention relates to calculating machines for use in connection with typewriting machines, that is to say machines adapted to add, or subtract, numbers as they are written in column by the numeral keys of the typewriting machine. It is essential to a machine of this class that the numeral keys may be used to print numbers without actuating the calculating mechanism except at predetermined portions of the travel of the paper carriage corresponding to the columns to be added, as for instance where dates are to be typewritten in making out the items of a bill and the values or charges are to be typewritten in a column to the right of the sheet as is usual. It is also essential to a satisfactory machine of this class that the numeral keys when used in typewriting numbers not in the column to be added shall be free to be depressed as easily as the other typewriter keys, that is the "touch" of the numeral keys shall not be different from that of the other typewriter keys, and that, when used in typewriting numbers in the column to be added, the numeral keys shall be capable of being operated with substantially the same touch as the other keys. It is also essential to secure absolute accuracy and to prevent the possibility of any movement of the index wheels except when the column in which the numbers are to be added is reached and then only when a numeral key is depressed.

In the machine of my present invention the numeral keys are employed for releasing and controlling the operation of the calculating mechanism not for operating such mechanism, the calculating mechanism being operated by power mechanism preferably a spring motor, and except when the carriage has reached the portion of its travel in which the numbers to be added are to be typewritten, the numeral keys are wholly disconnected from the mechanism for releasing and controlling the calculating mechanism, so that no additional work is thrown upon the numeral keys except when the numbers to be added are to be written and even then the work thrown on them is so slight as not to make any substantial difference in touch between them and the other typewriter keys, with the result that the numeral keys may at all times be operated with the same speed that the other keys are operated.

In the machine of my present invention, while the movement of the paper carriage of the typewriting machine is utilized to release or trip, at the proper time, the mechanism by which the typewriter keys are connected with the releasing and controlling devices no additional work beyond the mere releasing or tripping of this mechanism is thrown on the carriage.

In the machine of my present invention the index wheels are normally disconnected from the power mechanism and are positively locked against operation until released and connected to the power mechanism through the release, by the carriage, of the mechanism by which the numeral keys are connected to the releasing and controlling mechanism, and the subsequent depression of a numeral key; the power mechanism is also positively locked against operation except upon the depression of a numeral key and, after its release by the depression of a numeral key, is again locked upon the completion of its predetermined movement of rotation; the power mechanism is so arranged that the force applied to the operation of the calculating mechanism is constant and when the power begins to be exhausted the action of the power mechanism on the calculating mechanism is automatically stopped and the numeral keys are also locked against operation so that the calculating mechanism cannot be operated until the power mechanism is again wound up.

In the machine of my present invention means are provided by which the calculating mechanism may be operated either to add or subtract and the change from adding to subtracting or vice versa may be readily made by the movement of a single lever.

In the machine of my present invention two sets of index wheels are provided so arranged that both may be used for adding simultaneously, or one may be used to add and the other to subtract, or the two may be used in adding or subtracting the numbers in two separate columns.

My present invention consists in a machine constructed to carry out the above stated purposes and other purposes hereinafter described and in the construction and combination of elements hereinafter described and particularly pointed out in the claims.

Referring to the drawings: Figure 1 is a side view showing a typewriting machine in position on the frame of the calculating machine, the frame being partly broken away to show part of the mechanism of the calculating machine; Fig. 2 is a top plan view of the calculating machine with the typewriting machine removed; Fig. 3ª is a front elevation on an enlarged scale of the left hand half of the calculating machine showing also the numeral keys of the typewriting machine; Fig. 3ᵇ is a similar view of the right half of the machine, the two views 3ª and 3ᵇ taken together showing a complete front elevation; Fig. 4ª is a top plan view on the same scale as Figs. 3ª and 3ᵇ showing the left hand half of the front portion of the calculating machine showing also the numeral keys of the typewriting machine; Fig. 4ᵇ is a similar view of the right hand half of the front portion of the calculating machine; Fig. 4ᶜ is a similar view of the left hand half of the rear portion of the calculating machine; and Fig. 4ᵈ is a similar view of the right hand half of the rear portion of the calculating machine showing the power mechanism, the four views 4ª, 4ᵇ, 4ᶜ, and 4ᵈ taken together presenting a complete plan view of the calculating machine. Fig. 5ª is a side elevation on an enlarged scale of the front half of the calculating machine, the side piece of the frame being removed. Fig. 5ᵇ is a similar view of the rear half showing the power mechanism. Fig. 6 is a vertical sectional view on line 2—2 of Feb. 4ᵇ. Fig. 7 is a vertical sectional view one line 3—3 of Fig. 4ᵇ. Fig. 8 is a vertical sectional view on line 4—4 of Fig. 4ᵇ. Fig. 9 is a vertical sectional view on line 5—5 of Fig. 4ᵇ. Fig. 10 is a vertical sectional view on line 6—6 of Fig. 4ᵇ. Fig. 11 is a vertical sectional view on line 7—7 of Fig. 4ᵇ. Fig. 12 is a vertical sectional view on line 8—8 of Fig. 4ª. Fig. 13 is a vertical sectional view on line 9—9 of Fig. 4ª. Fig. 14 Sheet 13 is a vertical sectional view on line 10—10 of Fig. 4ᵇ. Fig. 15 is a vertical sectional view on line 15—15 of Fig. 4ᵈ. Fig. 16 is a vertical sectional view on line 16—16 of Fig. 4ᵈ. Figs. 17, 18, 19, 20, 21, and 22 are detail sectional views on lines a—a, b—b, c—c, d—d, e—e and f—f of Fig. 4ᵇ, respectively. Fig. 17ª is a detail view in elevation of the bell crank lever. Fig. 18ª is a detail view in elevation of the lower bell crank lever. Figs. 19ª, 19ᵇ, and 19ᶜ are detail views in elevation of the upper carrying lever 209, the lever 223 carried by the upper carrying lever, and the carrying pawl of the upper carrying lever. Fig. 20ª is a detail view in elevation of the upper bell crank lever 207. Figs. 21ª, 21ᵇ, and 21ᶜ are detail views in elevation of the lower carrying lever 210, the lever 238 carried by the lower carrying lever, and the carrying pawl of the lower carrying lever. Figs. 22ª, 22ᵇ, and 22ᶜ are detail views in elevation of the upper locking pawl 52, the lever 58, for lifting the locking pawls, and the lower locking pawl 53. Fig. 23 is a front elevation of the tripping device showing it in position to release the dog 182. Fig. 24 is a side view of a portion of the typewriting machine showing the tripping device in position. Fig. 25 is a vertical sectional view on line 25—25 of Fig. 23. Fig. 25ª is a back view of the back plate of the tripping device. Fig. 26ª is a front elevation on an enlarged scale of the left hand half of the upper portion of the typewriting machine showing the tripping device and the mechanism operated by it. Fig. 26ᵇ is a similar view of the right hand half of the upper portion of the typewriting machine, the two views Fig. 26ª and Fig. 26ᵇ forming together a complete view. Figs. 27ª, 27ᵇ, 27ᶜ, 27ᵈ, 27ᵉ, 27ᶠ, 27ᵍ, 27ʰ, 27ⁱ, and 27ʲ are detail views showing parts of the tripping device as hereinafter described. Fig. 28 Sheet 11, shows the hand piece of the shifting lever, in side view and elevation. Fig. 29 shows the swinging frame in front elevation and side view. Fig. 30 shows the short lever 330 in front and side view. Fig. 31 shows the locking dog 136 in front and side view. Fig. 32 shows the link 135 connecting the lever arm 130 with the locking dog 136 in side and top view. Fig. 33 shows the lever arms 129 and 130 in side and front view. Fig. 34 shows the locking pawl 102 in top, side and end view. Fig. 35 Sheet 12 shows the sliding frame 252 in top view, side view and end view. Fig. 36 shows the slide 146 in position in side and end view. Fig. 37 shows the slide 146 in top view. Fig. 38 is a top view of the support on which the slide 146 reciprocates. Fig. 39 is a detail side view of the slide 146. Fig. 40 is a detail side view of the support on which the slide 146 reciprocates. Fig. 41 Sheet 14 shows in front and side view the bar 60 and the slotted arms 61 carried by it. Fig. 42 shows in top view and side view the horizontal lever 158 with its yielding pawl 164. Fig. 43, Sheet 15, shows in detail the slide bar 78. Fig. 44 shows in end view the slide bar 78 and the cam plate 72. Fig. 45 shows in side and edge view the pawl 93 on the end of the slide bar 78. Fig. 46 shows in side and edge view the arm 91 on the end of the slide bar 78. Fig. 47 shows in side and end view the roller 77 of the slide bar 78. Fig. 48, Sheet 17, is a detail sectional view on line g—g of Fig. 4ª. Fig. 49 shows in front and side view the rock shaft 82 and its connections for shifting the selector. Fig. 50, Sheet 18, is a detail view of the shaft 17 and sleeve 18. Fig. 51, Sheet 22, is a detail horizontal section showing the connection of the slide rod and the vertical shaft operated by it. Fig. 52 is a detail plan view of the inner frame carrying the controlling mechanism. Fig. 53, Sheet 4, shows in plan and side view the slide for operating the sliding frame and the reversing lever. Fig. 54, Sheet 17, shows in rear elevation, end view and front elevation the running gear connecting the rotary shafts which drive the index wheels of the two groups. Fig. 55, Sheet 22, is a top view of the pivoted dog 182.

Referring to the drawings 1 indicates the frame of a typewriting machine here shown as of the usual under strike type though my invention may be readily adapted to typewriting machines of any type having a keyboard with numeral keys.

2 indicates the numeral keys from 1 to 9 inclusive.

3 indicates the paper carriage of the typewriting machine provided with a notched bar 4 extending longitudinally thereof and supported from the carriage by a pair of curved arms 5. This notched bar 4 is arranged as shown in front of and a little below the plane of the top plate of the typewriting machine. On this notched bar 4 is arranged a pair of tripping devices 6. (See Figs. 26ª and 26ᵇ).

7 indicates the frame of the calculating machine provided in its rear portion with brackets 8 adapted to receive the feet usually provided on the base of typewriting machines, and having in its rear portion a power mechanism 9 and having in its front portion beneath the keyboard of the typewriting machine, when the latter is in position, the index wheels and other portions of the calculating mechanism.

10 and 11 are two upwardly extending posts at opposite sides of the frame of the calculating machine so located that, when the typewriting machine is in position, they will be outside of and in front of the plane of the front uprights or posts of the typewriting machine.

12 is a bar connecting the two posts 10 and 11 and supporting about midway of its length a box or frame 13 through which slide rods 14 and 15 each of which is provided at its outer end with a rack 16.

The post 10 is hollow and within it is arranged a vertical shaft 17 and a sleeve 18 supporting it. (See Figs. 13, 51 and 53). The shaft 17 is provided near its upper end with a pinion 19 which meshes with the rack 16 of rod 14 and with a pinion 20 near its lower end which meshes with a rack bar 21 parallel with the side of the frame 7 and carried in suitable bearings. The sleeve 18 is provided near its upper end with a pinion 22 which meshes with the rack 16 on the rod 15 and with a pinion 23 near its lower end which meshes with a rack bar 24 arranged parallel with the rack bar 21 and supported in suitable bearings carried by the side piece 395 of the frame 7. Each of the rack bars 21 and 24 is provided with a spring 25 (see Figs. 4ᶜ and 13) connected at its rear end to the rack bar and at its forward end to a pin or post fixed to the frame, the springs acting to force the rack bars forward when they are released as hereinafter described.

The rack bar 21 is provided near its forward end with teeth 26 meshing with a gear 27 journaled on a fixed rod 28, (see Figs. 3ª and 13) the gear 27 in turn meshing with a pinion 29 on a shaft 30 which extends across the front of the machine and is provided on its left hand portion with a selector 31 consisting of a cylinder carried by a sleeve 32 splined to the shaft 30 so as to turn with it but be capable of a longitudinal movement on it.

Above and slightly to the rear of the vertical plane of the selector shaft 30 is mounted the shaft 33 for rotating the index wheels 34. These index wheels are hollow to permit the shaft 33 to rotate freely within them and are provided with bearings concentric with the axis of the shaft 33 in vertically arranged fixed plates 35 which are supported on rods 397, 398 and 399 and are spaced apart by means of bent portions 36. Each index wheel 34 is carried (see Figs. 8, 10 and 17 to 22) at the right of the vertical plate 35 in which it has its bearing and is provided also at the left of the bearing with a gear 37 and is provided at the right of the bearing with a disk or gear 38 having teeth 39 on its interior to be engaged by a sliding clutch member on the shaft 33, and having teeth 40 on its exterior to be engaged by the locking pawls and carrying pawls.

On the shaft 33, which is preferably square in cross section, between each two fixed plates 35 is mounted a sliding clutch member 41 rotating with the shaft 33 but free to be moved into and out of engagement with the internal teeth 39 of the gear 38. (See Figs. 4ᵇ, 10, and 20). The clutch member 41 is provided with an annular groove 42 into which extends the forked end of a slide 43 which is carried by and slides freely on a fixed rod 44 supported by the fixed plates 35 directly above the shaft 30 carrying the selector 31. Beneath the rod 44 pivoted on the bent portion 36 is a bell crank lever 45 (see Fig. 17ª) having its upper arm 46 in position to engage the slide 43 to cause it to move, moving the clutch member 41 into or out of engagement with the internal teeth of the clutch gear 38. The lower arm of the bell crank lever 45 has two fingers 47 and 48, the finger 47 being twisted so as to present a broad bearing surface at right angles to the plane in which the lever swings, and extending downward somewhat farther than the finger 48 which is in the plane on which the lever swings. Above the finger 48 the bell crank lever 45 is provided with a bent finger 49 for a purpose hereinafter described.

The selector 31 is provided with a spirally arranged row of studs 50 and cam pins 51 extending from end to end of the cylinder which is preferably cut away as shown. (See Fig. 3ᵇ.) When the selector is positioned through the action of the rack bar 21 a stud 50 is brought in line with the finger 47 of one of the bell crank levers and, upon the sliding of the selector, as hereinafter described, the stud 50 acting against the finger 47 swings the bell crank lever and through the arm 46 and slide 43 moves the clutch member 41 into engagement with the internal teeth 39 of the clutch gear 38 so that upon the rotation of the shaft 33, as hereinafter described, the index wheel 34 will rotate with it. On the release of the selector the cam pin 51 will come in contact with the finger 48 and by lifting it will insure the return of the slide 43 to normal position and the disengagement of the clutch member 41 from the teeth 39.

Pivoted on the fixed plate 35 are two locking pawls 52 and 53 (see Fig. 22) arranged respectively above and below the plane of the axis of the index wheels 34 and adapted to engage the teeth 40 on the external periphery of the gear 38 and being held in yielding engagement therewith by springs 54 and 55 respectively, these locking pawls being so arranged that the upper pawl will permit the index wheel 52 to rotate freely in the direction opposite the direction of movement of the hands of a watch but will normally lock it against movement in the opposite direction, and the lower locking pawl will permit the index wheel to rotate freely in the direction of movement of the hands of a watch but will normally lock it against movement in the opposite direction. In order to permit the index wheel to rotate when it is clutched to the shaft 33, it is necessary to release one or the other of these locking pawls depending upon whether the calculating mechanism is being used for adding and subtracting. For this purpose the upper locking pawl 52 is provided forward of its pivot with a depending arm 56 with which engages an arm 57 on the rear end of a lever 58 the forward end of which extends outward between the fingers 48 and bent finger 49 of the bell crank lever 45 so that after the bell crank lever has been operated by the shifting of the selector 31 the forward end of the lever 58 which is forced upward by the action of the springs 54 and 55 will cause the locking lever 52 to be disengaged from the teeth 40. The lower edge of the lever 58 engages the upper edge of the lower locking lever 53 forward of its pivot so that as the forward end of the lever 58 is depressed by the finger 49 as above described it will free the locking lever 53 from engagement with the teeth 40. In order to permit the forward end of the locking lever 53 to pass above the lever 58 to engage teeth 40, the forward portion of lever 58 is offset as shown at 59.

It will of course be understood that the mechanism just described for operatively connecting the index wheel 34 with the shaft 33 is provided for each one of the series of index wheels. Carrying mechanism so arranged that a complete rotation of an index wheel of lower denomination will cause the index wheel of the next higher denomination to be rotated one space is, of course, provided as is usual in calculating machines. The construction and arrangement of the particular carrying mechanism here shown will be hereinafter described.

Pivoted on the side pieces 39⁴ and 39⁵ of the frame of the calculating machine below and slightly forward of the bases of the posts 10 and 11 is a bar 60 (see Figs. 13 and 41) carrying a series of upwardly extending slotted arms 61 one for each of the numeral keys of the typewriting machine. This bar 60 has a forwardly extending arm 62 the end of which is bent over to form a frame within which are journaled rollers 63 and 64 in line respectively with the rack bars 21 and 24. Each of these rack bars is provided on its upper edge with a cam 65 adapted, as the rack bar slides forward under the influence of its spring 25, to come in contact with one of the rollers and to cause the free end of the arm 61 to be raised to swing the slotted arms rearward. The cams 65 are of such length that, as the rack bars 21 and 24 complete their forward movement, they will pass from under the rollers and permit the free end of the arm 62 to drop under the influence of a spring 66.

Extending across the machine forward of the bases of the posts 10 and 11 is a fixed rod 67 and near the lower edges of the side pieces of the frame 7 are two fixed rods 68 and 69. Carried by the fixed rods 67, 68 and 69 and suitably spaced thereon are vertical plates 70 corresponding in number with the numeral keys of the typewriting machine. Each of these vertical plates 70 is provided below and about in line with the fixed rod 67 with a stud 71 on which is journaled a cam plate 72 (see Figs. 13 and 44) provided forward of its journal with a cam 73 adapted to act against a roller 74 on the upper arm of a bell crank lever 75 to push it forward. In rear of the journal the cam plate 72 is bent over to form a cam or wedge 76 adapted to act against a roller 77 on a slide bar 78 arranged to slide parallel with the fixed rod 67 to push the slide rod to the right.

The horizontal arm of the bell crank lever 75 extends forward above a bail 79 which is pivoted at its ends in a fixed portion of the frame. About midway of its ends the bail 79 is connected by a link 80 to an arm 81 secured on a rock shaft 82 arranged parallel with the side pieces of the frame and suitably journaled (see Figs. 4ª, 12 and 49). This rock shaft 82 is provided at its forward end with a downwardly extending slotted arm 83 which fits over and engages a collar 84 on the sleeve 32 which carries the selector 31 so that as the cam 73 acts upon the bell crank lever 75 through the roller 74 causing the horizontal arm of the bell crank lever to press the bail 79 downward, the rock shaft will be caused to move the selector 31 to the right to effect the clutching of one of the index wheels to the shaft 33 as above described. A spring 85 serves to return the rock shaft 82 and with it the bail 79 to normal position.

The slide bar 78 is guided at its left hand end by a suitably shaped slot 86 in the vertical plate 70 and at its right hand end is guided in bearings formed in a circular guide plate 87 (see Figs. 4ᵇ, 9, 10, and 14) and in bearings formed in the inwardly bent end 88 of a horizontal arm 89 carried by the guide plate. The slide bar 78 is drawn back to normal position by a spring 90 secured at one end to the guide plate 87 and at the other end to an arm 91 formed by bending the end of the slide bar over at a right angle. A stop pin 92 on the inwardly bent end 88 of the arm 89 determines the position of the slide rod when retracted.

While only one slide rod has been described it should be understood that the slide rods correspond in number with the numeral keys there being one slide rod for each vertical plate 70 the slide rods differing in length according to the distance from the circular guide plate 87 of the particular vertical plate 70 which carries the particular cam plate 72 corresponding to and to be actuated by a particular numeral key of the typewriting machine as hereinafter described (see Fig. 14). The group of slide bars is arranged about a central line (see Figs. 9, 10 and 11), on which line the several cam plates 72 are arranged to rock, the slide bars being arranged at equal distances from the central line and at equal distances from each other except that between the two slide bars in rear of the central line twice as much space is left as between the others.

The slide bars are nine in number and the slots which carry them are spaced one tenth of the circumference apart so that one slot is unoccupied by a slide bar. It should also be understood that the position of the cam or wedge 76 on the several cam plates 72 differs, being so placed on each of the cam plates as to be brought into action against the roller 77 of the proper slide bar 78.

Each of the slide bars 78 carries on its right hand end a pawl 93 pivoted at 94 on the bent over end 91 of the slide bar (see Figs. 10 and 44 to 47). A spring 95 connected at one end to the pawl and at the other end to the end of the arm 91 holds the pawl with its end nearly in line with the slide bar.

On a shaft 96 in line with the central line on which the cam plates 72 are arranged to rock, and fixedly supported in the supplemental frame 407 is mounted a sleeve 97. This sleeve is provided near its right hand end with a pinion 98 with which meshes a gear 99 which is in gear with the power mechanism 9. Near the pinion 98 and also on the sleeve 97 is a brake wheel 100 having ten ratchet teeth 101 equally spaced apart on its periphery adapted to be engaged by a locking pawl 102 pivoted in rear of the shaft 96, when this locking pawl is depressed as hereinafter described. Also on the sleeve 97 and near the brake wheel 100 is a bevel gear 103 which is in mesh with a bevel pinion 104 on a shaft 105 suitably journaled in fixed bearings and extending forward and having on its forward end a bevel gear 106 adapted to mesh with one or the other of two oppositely arranged bevel gears 107, 108 carried by a sleeve 109 splined on the shaft 33 by which the index wheels 34 are rotated (see Figs. 4ᵇ, 5ª 6 and 7). The sleeve 97 also carries a master wheel (see Figs. 4ᵇ, 7, 8, 9, 10 and 14) by which, in coöperation with mechanism part of which has been already described, the amount of rotation to be imparted by the power mechanism, to the particular index wheel which has been clutched to the shaft 33, is determined. This master wheel comprises two disks 110 and 111 of which the left hand disk 110 is of slightly larger diameter than the other. These disks are suitably spaced apart and are provided near their peripheries with radial guide slots 112 the guide slots of one disk being in line with those of the other, and serving to guide stop bars 113. Each of these stop bars is provided on its outer edge between the disks 110 and 111 with a projection or stop 114 and is also slightly notched to form a shoulder 115 to normally engage the outer end of the guide slot 112 of the disk 111, this guide slot being sufficiently long to permit the stop bar to pass through it when pressed inward sufficiently to disengage the shoulder 115 from the end of the slot. On its under edge near the portion which rests in the slot 111 the stop bar 113 is provided with a cam projection 116 which is adapted, when the stop bar is being restored to initial position as hereinafter described, to strike the inner end of the slot 112 and cause the shoulder 115 to be thrown into position to engage the outer end of the slot 112. To the left of and outside the disk 110 the stop bar 113 is provided with an inclined cam 117 and with an inwardly extending arm 118 having a lateral extension or foot 119 which rests in a slot 120 formed in the sleeve 97. A coiled spring 121 bears at one end against a projection 122 at the left hand end of the sleeve 97 and at the other end against the end of the stop bar 113 tending to press the stop bar outward and toward the right and normally holding the stop bar with its notch 115 in engagement with the outer end of the slot 112 of the disk 110.

The stop bars 113 are ten in number (see Fig. 8) and are arranged at equal intervals about the periphery of the master wheel. When the master wheel is at rest nine of the stop bars will be respectively in line with the end of the pawl 93 of one of the slide bars 78 so that if one of the slide bars is operated it will cause the side of the pawl 93 to come in contact with the cam 117 of one of the stop bars forcing the stop bar inward and releasing the shoulder 115 from the end of the slot 112 and permitting the stop bar to move to the right under the influence of the spring 121 carrying its stop 114 to the right out of line with the stops 114 of the other stop bars.

The movement of the cam plate 72 by which, as above described, the bell crank lever 75 is operated to cause the lateral shifting of the selector 31, and the slide bar 78 is operated to shift one of the stop bars 113, is effected by the depression of one of the numeral keys of the typewriting machine through the engagement of a notched plate 123 carried by it (see Figs. 11 and 13), with an arm 124 on the upper end of a rod or wire 125 which is connected at its lower end to an arm 126 on the cam plate 78, its upper end being guided in the slot of the arm 61, the arm 124 being normally out of engagement with the notched plate 123 and being swung into engagement therewith by the action of the cam 65 of one of the rack bars 21 or 24.

The notched plate 123 is adjustably secured to a clip adapted to be secured to the key lever of a numeral key. Below the notch 127 the plate 123 is provided with a forward extension 128 on which the arm 124 rests. Above the notch 127 the plate is cut away as shown. When the slotted arms 61 are in normal or forward position the arm 124 rests on the extension 128 forward of the notch 127 so that when the key is depressed the arm 124 will remain in position without being depressed. When the slotted arms 61 are swung to rearward position the arm 124 will be carried into the notch 127 so that depression of the key will carry down with it the arm 124 and the rod or wire 125 to swing the cam plate 72.

In the rear of the master wheel and also carried by the supplemental frame 407 is arranged the mechanism for depressing the locking pawl 102 into position to engage the teeth 101 of the brake wheel 100. (See Figs. 4ᵇ, 6, 7, 8, 31 to 34 and 36 to 40). This mechanism comprises a rock lever having two parallel arms 129 and 130 connected by a horizontal portion 131 and mounted to swing on a fixed rod 132 suitably supported in the frame. The arm 129 of this lever is provided on one side with an arm 133 bent to form with the arm, a frame in which is supported a roller 134 which is so arranged that it will be in the path of the projections 114 of the stop bars 113 when they are shifted as above described so that after a stop bar has been shifted and the master wheel is rotated the projection 114 on such stop bar will strike the roller 134 and swing the lever 129 rearward. The arm 130 of the lever is connected at its upper end by a link 135 with a locking dog 136 pivoted at its upper end in a fixed bracket 137, and provided at its free end with a cam face 138 adapted to engage a cam face 139 formed on the upper face of the free end of the locking pawl 102 to force the end of the pawl downward into engagement with the brake wheel 100. About midway of its length the arm 130 is provided with a finger 140 bent at a right angle and extending beneath the locking pawl 102 to engage a cam projection 141 on the under side of this pawl so that as the arm 129 is returned to normal position this finger 140 will, by acting against the cam 141, insure the lifting of the end of the pawl out of the path of the teeth of the brake wheel 100.

The arm 129 is connected at its upper end by a pin 142 to the upper end of a lever 143 pivoted at 144 to an upright 415 carried by the supplemental frame 407, and having its lower end slotted to fit over a pin 145 on a slide 146 arranged to be movable on the upright 415 (see Figs. 7, 36, 37 and 39), the arrangement being such that as the arm 129 is swung in one direction it will cause the slide 146 to move in the opposite direction. A spring 147 carried at one end on the pivot of the locking pawl 102 and having its other end bearing upward against a finger 148 on the rear of the lever 143 serves to press the slide 146 normally to the rear. The slide 146 carries on its lower edge a laterally bent cam finger 149 which is so located that when the slide is in its forward position this cam finger will lie in the path of the projecting right hand end of any stop bar 113 which has been previously shifted to bring its stop 114 in position to engage the roller 134 on the arm 129.

On its rear edge about in line with the roller 134 the arm 129 is provided with a finger 150 projecting to the right and adapted to engage and be locked by a tooth 151 on the end of a locking dog 152 pivoted at 153 to a fixed portion of the frame and provided with a spring 154 tending to swing it into position to engage the finger 150 (see Fig. 42). The locking dog 152 also has an arm 155 having a down-turned end 156 and a cam face 157 this arm 155 being so located that when the arm 129 is forced rearward as hereinafter described the side of arm 133 will come in contact with the cam face 157 to insure the swinging of the locking dog to bring its tooth 151 into locking engagement with the finger 150 and thus lock the arm 129 in retracted position.

Pivoted on the supplemental frame in rear of the circular guide plate is a horizontal lever 158 (see Fig. 42) the free end of which extends forward and is forked to fit over a collar 159 on a sleeve 160 (see Figs. 4$^b$ and 14) mounted to slide on the reduced end portion of the shaft 96. This sleeve 160 is provided with ten pairs of radial projections 161 and 162 each pair of projections being in line with and extending outward into a slot 120 of the sleeve 97 and being spaced apart to receive between them the lateral extension or foot 119 of the stop bar 113. This lateral extension or foot 119 of the stop bar 113 has at its heel a downward projection 163 which is adapted to engage the projection 162 of the sleeve 160, as hereinafter described.

On the lever 158 is pivoted a yielding locking pawl 164 extending to the left with its free end in position to strike the down-turned end 156 of the arm 155 of the locking dog 152. When the locking dog 152 is in locking position, that is with its tooth 151 engaging the finger 150, the downward projection 156 on the arm 155 of the locking dog 152 is against the end of the locking pawl 164 holding the lever 158 over so that its free end holds the sleeve 160 over to the left with its projections 162 against the projections 163 of the heels of the stop bars. On the depression of one of the numeral keys, for instance the 9 key, the arms 124 of the wires 125 being in position to be engaged by the notches 127, the cam plate 72 corresponding to the 9 key is rocked bringing the arm 73 against the roller 74 and through the bell crank lever 75 and its connections sliding the selector 31 to the right to clutch one of the index wheels to the shaft 33. Further movement of the cam plate 72 brings the wedge cam 76 against the roller 77 on the slide bar 78 pushing the slide bar to the right and through the pawl 93 acting upon the cam 117 of that one of the stop bars 113 which is opposite the end of the slide bar, releasing the shoulder 115 from the end of slot 112 and permitting the stop bar to move to the right.

In the normal position of the master wheel and the mechanism above described controlled by it, the stop bars 113 are in inoperative position that is with their projections 114 in line and in position to pass freely by the roller 134 of the arm 129, with arm 129 locked in its rearward position by the tooth 151 of the locking dog 152 engaging the finger 150. With the arm 129 in this position the free end of the locking pawl 102 is held down on the brake wheel 100 by the locking dog 136, stopping the mechanism by the engagement of the end of the pawl 102 with a tooth 101 of the brake wheel. The slide 146 is in its forward position with its cam finger 149 in position to be struck by the projecting right hand end of the stop bar 113 which, as above described, has been shifted to the left from its normal or inoperative position into position in which its stop 114 is in the plane of the roller 134 on the arm 129.

The shifting of the stop bar 113 is effected by the spring 121 aided by the push of the pawl 93 on the slide bar. As the stop bar shifts to the right the projection 163 on its heel engages the projection 162 on the sleeve 160 drawing the sleeve 160 over to the right carrying its projections 161 under the toes of all of the stop bars 113 except the one acted on by the slide bar and thus locking them against operation until the stop bar 113 acted on is restored to normal position, and drawing the forward end of lever 158 to the right. As the free end of the lever 158 moves to the right the pawl 164 strikes the down-turned end 156 of the locking dog 152 forcing the free end of the dog to the right and disengaging the tooth 151 from the finger 148 permitting the arm 129 to rock to its forward position and permitting the arm 130 to also swing forward releasing the locking dog 136 and raising the locking pawl 102 and at the same time the slide 146 is moved rearward. The locking pawl 102 being thus raised out of the path of the teeth 101 of the brake wheel 100 the power mechanism, acting through the pinion 98, causes the sleeve 97 and the parts carried by it, to rotate until the projection 114 of the stop bar 113 which has been previously shifted by the operation of the 9 key, as above described, comes against the roller 134 forcing the arm 129 to rock rearward. As the master wheel rotates the spring 95 permits the pawl 93 to yield as the stop bars 113 which follow the one acted on by it are carried past it. This movement of the arm 129 through the arm 130 and locking dog 136 presses the end of the locking pawl 102 down against the periphery of the brake wheel between two teeth. At the same time by the action of the lever 143 the slide 146 is forced forward to bring its cam finger 149 into the path of the end of the stop bar 113 which has been shifted as described. The end of the locking pawl 102 not being in contact with a tooth 101 of the brake wheel a further movement of the sleeve 97 is permitted until a tooth 101 of the brake wheel comes against the end of the locking pawl, stopping the movement of the mechanism. By this further movement the projection 114 of the stop bar 113 is carried past the roller 134 rocking the arm 129 farther to the rear into locking engagement with the tooth 151 of the locking dog 152. At the same time the end of the stop bar coming in contact with the cam finger 149 of the slide 146 is forced to the left and restored to normal position. As the arm 129 is rocked to the limit of its rearward movement the arm 130 swings the locking dog 136 into positive locking engagement with the end of the locking pawl 102 and the mechanism is thus stopped as the tooth of the brake wheel comes against the end of the locking pawl. As the stop bar 113 is restored to normal position the projection 163 on its heel moves to the left permitting the sleeve 160 to move to the left carrying with it the free end of the lever 158 drawing the pawl 164 also to the left so that its end is in position to engage the down-turned end 156 of the arm 155 of the locking dog 152. The mechanism is then in position to be again operated. The slide bars 78 corresponding to the different numeral keys being arranged in a series about a center as above described a different stop bar 113 will be in position to be operated by each of the slide bars and the movement of rotation of the master wheel will depend upon which stop bar is operated. The stop bars being ten in number, the operation of the 1 key of the typewriter will cause the shifting of that one of the stop bars which is one space or tenth of the circumference from the stop bar last operated to cause the stopping of the mechanism. And the operation of the 9 key will cause the shifting of that one of the stop bars which is nine spaces or nine tenths of the circumference from the stop bar last operated.

It will of course be understood that the rotation of the sleeve 97 as above described causes that one of the index wheels 34 which has been clutched to the shaft 33 to be rotated through the bevel gear 103, and the train of gearing connecting it with the shaft 33, the extent of such rotation of the index wheel being determined by the extent of rotation of the master wheel.

As has been above indicated the selector 31 is rotated to the proper position to clutch the desired one of the index wheels 34 to the shaft 33, through the rack bar 21 the movement of which is controlled by the movement of the paper carriage of the typewriting machine. Referring in detail to the mechanism for controlling this movement of the selector (see Figs. 23, 24, 25, 26ᵃ, 26ᵇ, and 27ᵃ to 27ⁱ), the tripping device 6, of which there are preferably two carried by the rack bar 4, as hereinafter described, comprises a plate 165 having its upper and lower edges bent over to embrace the rack bar 4 as shown and to form a back plate 167 and having on its upper edge midway between its ends at 166 a spring pressed dog 168 adapted to engage the teeth of the rack bar and having a thumb piece 169 by which the dog may be raised out of engagement with the teeth of the rack bar to permit the tripping device to be shifted to the position desired. Carried on pins 170 at opposite ends of the plate 165 and near its lower edge, is a cam plate 171 having on its lower edge cams 172 and 173, the cam 173 extending below the line of the cam 172 and being bent forward out of the plane of the cam 172. The pins 170 pass through slots 174 in the cam plate so that the cam plate is permitted a limited vertical movement. A spring 175 secured to the plate 165 by a screw 176 serves to press the cam plate normally upward. Midway of its length the cam plate 171 is provided with an upwardly extending cam 177 adapted to be engaged by an arm 178 on a lever 179 pivoted on the plate 165.

On the slide rod 14 is secured a plate 180 which extends upward through a slot 181 in the top of the box or frame 13. On the upper end of this plate 180 is pivoted a dog 182 having on its forward or left hand end an upwardly projecting cam 183 and also having on this end a rearwardly bent finger 184 adapted to engage a guide bar 185 secured to the top of the box or frame 13 and extending to the right about half the length of this box or frame. At its right hand end the dog 182 is provided with a forwardly bent finger 186 and also has its end cut away to form an incline or cam 187. On the right hand end of the box or frame 13 is a forwardly projecting lug 188 in line with the cam 187 of the dog. In normal position the dog 182 rests with its right hand end beneath the lug 188 and its left hand end raised with the finger 184 resting against the end of the guide bar 185. The tripping device 6 is so supported on the rack bar 4 that when the cam plate 171 is in elevated position its cams 172 and 173 will pass over the cam 183 of the dog 182 but when the cam plate 171 is depressed by the lever 179 the cam 172 will, as the device reaches the point predetermined by adjusting the tripping device on the rack bar, strike the cam 183 depressing the forward end of the dog and disengaging the finger 184 from the end of the guide bar 185. The same movement throws the finger 186 on the rear end of the dog up into position to engage the rear face of the cam 173 of the tripping device. The spring 25 acting on the rack bar 21 causes the slide rod 14 to move to the right and to follow the carriage as it moves step by step toward the right of the typewriting machine. When the dog 182 reaches the end of its movement the finger 184 strikes the post on which the guide bar 185 is supported, the carriage of the typewriting machine being left free to complete its movement toward the right. On the return of the carriage to the left of the typewriting machine the cam 173 strikes the finger 186 and carries the dog 182 back to the initial position until the cam 187 strikes the lug 188 and depresses the right hand end of the dog throwing the finger 186 down below the line of the lower end of the cam 173 and raising the left hand end of the dog so that its finger 184 will be up in position to engage the end of the guide bar 185. The return of the dog 182 to initial position draws the slide rod 14 to the right and, through the gearing operated by the rack 16, draws the rack bar 21 rearward and restores the selector 31 to initial position.

From the above description it will be seen that the carriage of the typewriting machine in its movement to the right has no work to do in reference to the calculating machine, except that of depressing the left hand end of the dog 182.

The front of the box or frame 13 is slotted as shown at 189 and is marked above the slot with a scale 190 and below the slot with a scale 191, and the plate 180 is provided with an indicator 192 which travels over the scales.

Referring in detail to the carrying mechanism here shown in connection with the index wheels 34 (see Figs. 17 to 22), the gear 37 with which each of the index wheels is provided adjacent to its bearing in the fixed plate 35, meshes with a gear 200 carried by a sleeve 201 which is mounted to rotate freely on a fixed rod 202 supported in rear of the axis of the shaft 33 by the fixed plate 35, the sleeve being of such length as to fit between and be held from longitudinal movement on the rod 202 by two of the fixed plates 35. The sleeve 201 carries two oppositely arranged snail cams 203 and 204 and two oppositely arranged tappet cams 205 and 206.

Supported in the rear portions of the fixed plates 35 respectively above and below the line of the axes of the shaft 33 and the fixed rod 202 are fixed rods 207 and 208. On these rods are pivoted at their rear ends, carrying levers 209 and 210. The upper carrying lever 209 (see Figs. 19 and 19ª) has its rear end bent to U-shape so as to fit between two of the fixed plates 35 and to be held by them from lateral movement. At its forward end the carrying lever 209 is bent laterally at 211 and then downward as shown at 212 to receive the pivot of a depending carrying pawl 213 the free end of which is adapted to engage the side faces of the teeth 40 of the clutch gear 38 of the index wheel carried by the left hand one of the two fixed plates 35. The carrying lever 209 is provided on its under side with a laterally bent lug 214 arranged in the plane of the snail cam 203, and with a laterally bent and forwardly extending finger 215 which is arranged in the plane of the locking pawl 52 and is adapted to engage a cam 216 on the end of a depending arm 217 on the rear end of the locking pawl to lift the pawl out of locking engagement with the teeth 40 of the clutch gear 38. At its rear end the carrying lever 209 is provided with an upwardly extending arm 218 and with a downwardly extending arm 219 having laterally bent fingers 220 and 221.

Pivoted on a stud 222 carried by the carrying lever 209 is a lever 223 the forward end of which is forked to engage a lug 214 extending rearwardly from the carrying pawl 213. The rear end of the lever 223 is provided with an upwardly extending arm 225. A spring 226 coiled on the stud 222 tends to press the forward end of the lever 213 downward and thus to press the end of the pawl 213 against the periphery of the clutch gear 38.

Pivoted on the lower rod 208 is a bell crank lever 227 (see Fig. 18) having an arm 228 extending forward, when in operating position, into position to be struck by the tappet cam 205 on the sleeve 201. An upwardly extending arm 229 of the lever 227 extends between the laterally bent fingers 220 and 221 of the arm 219 extending downward from the rear end of the carrying lever 209. A spring 230 tends to draw the carrying lever 209 downward.

When the mechanism is arranged for subtracting as hereinafter explained, as an index wheel of lower denomination is rotated, its gear 37 rotates the gear 200 and with it the sleeve 201 and its cams. The snail cam 203 acting against the laterally bent lug 214 on the carrying lever 209 gradually raises the lever and with it the carrying pawl 213. Just before the index wheel of lower denomination completes a rotation the highest point of the snail cam 203 is in contact with the lug 214 and the carrying lever is raised to its highest point and the forwardly extending finger 215 has been carried upward past the cam 216 on the arm 217 of the locking pawl 52. As the index wheel is further rotated to complete a full rotation the snail cam passes from beneath the lug 214 and the carrying lever descends under the influence of the spring 230. As the free end of the carrying lever begins its downward movement the end of the finger 215 (see Fig. 22) comes in contact with the cam 216 on arm 217 lifting the locking pawl 52 momentarily from engagement with the teeth 40, and while this locking pawl is thus disengaged the carrying pawl 213 begins to act on the teeth 40 turning the clutch gear 38 so that the flat outer face of a tooth will pass under the end of the locking pawl 52. The further downward swing of the free end of the carrying lever 209 completes the rotation of the index wheel of higher denomination through one space. While the spring 230 will ordinarily effect this movement of the carrying lever the movement of the carrying lever is made positive by the tappet cam 205 which, striking the end of arm 228 from beneath, swings the arm 229 of the bell crank lever 227 rearward against the depending arm 219 thus forcing the free end of the carrying lever 209 downward.

The lower carrying lever 210 (see Fig. 21), which is used in the adding operation as hereinafter described, is pivoted at its rear end on the lower fixed rod 208 and is similar in construction to the upper carrying lever 209 except that it is reversed, its carrying pawl 241 extending upward instead of depending like the carrying pawl 213, and the arm 231 at its rear end corresponding to the arm 218 of the lever 209, extends downward instead of upward and the arm 232 corresponding to the depending arm 219 at the rear end of lever 209 projects upward instead of downward. The lever 210 is provided with laterally bent lug 233 on its upper edge corresponding to the lug 214 on the lower edge of lever 209, this lug being bent into the plane of the snail cam 204, and the lever 210 also has a forwardly and upwardly extending finger 234 corresponding to the finger 215 carried by the lever 209, to act upon the cam 235 of an upwardly extending arm 236 on the lower locking pawl 237. The lever 210 carries a lever 238 pivoted on stud 239 and having a forked forward end to engage the lug 240 on the lower carrying pawl 241 and spring pressed by spring 242 and having a downwardly extending arm 243 at its rear end. The bell crank lever 244 (see Fig. 20) to effect the positive raising of the free end of the carrying lever 210 corresponds in construction to the bell crank lever 227 but is pivoted on the upper fixed rod 207 and has its forwardly extending arm 245, when in position for operation as hereinafter described, in the path of the tappet cam 206 so that its end will be forced downward to cause the downwardly extending arm 246 to strike the upwardly extending arm 232 of the carrying lever 210 forcing the free end of the lever and the carrying pawl 241 upward to turn the index wheel of higher denomination one space. The spring 230 is connected at its ends to the two carrying levers 209 and 210 (see Fig. 22). It will of course be understood that only one of the carrying levers is in position to operate at a time, the lower carrying lever being in position to operate when the calculating mechanism is to be used to add, the upper carrying lever being out of operative position, and when it is desired to use the calculating mechanism for subtracting, the upper carrying lever is in position to operate and the lower one is out of operative position. To effect the necessary shifting of the carrying levers a swinging frame 247 is provided pivoted at 248 on the fixed plates 35 at the ends of the series of index wheels on a line midway between the fixed rods 207 and 208. This frame comprises the vertical end portions 249 and upper and lower bails 250 and 251 the upper bail 250 being located in front of the upwardly extending arm 218 of the upper carrying lever 209 and the upwardly extending arm 225 of the lever 223, (see Fig. 19) and the lower bail 251 being located in front of the downwardly extending arms 231 and 243 of the lower carrying lever 210 and the lever 238 carried by it (see Fig. 21). When the shifting frame is swung on its pivots to move the bail 250 rearward the bail strikes first the arm 225 of the lever 223 and causes the forward end of this lever to lift the lug 224 of the carrying pawl 213 to swing the carrying pawl out of engagement with the teeth 40 and as the bail 250 moves farther to the rear it strikes the arms 218 of the carrying levers 209 and forces them rearward lifting the forward ends of the levers and with them the carrying pawls 213 so that the ends of the pawls will be raised out of contact with the teeth 40 and the carrying levers will be raised so that their lugs 214 will be out of contact with the snail cams 203. This movement of the upper carrying levers 209 puts the spring 230 under tension. In thus shifting the position of the carrying levers it is desirable to so shift the bell crank levers 227 and 244 that only the one which is to be used shall be in position to be acted on by its tappet cam. This shifting is effected by a laterally sliding frame 252 (see Fig. 35) carried by pins 253 on the rear of two of the fixed plates 35. The sliding frame 252 is provided on its upper and lower edges with a series of forwardly projecting fingers 254 the fingers on the upper edge each extending into a loop 255 between the arms 245 and 246 formed by bending an arm of the bell crank lever 244 (see Figs. 20 and 20*), and the fingers 254 on the lower edge of the frame extend into similar loops on the bell crank levers 227 (see Figs. 18 and 18*). As the sliding frame is shifted to the left by means hereinafter described, the bell crank levers 227 are shifted laterally to the left so that the ends of their arms 228 are brought into the plane of movement of the tappet cams 205 and at the same time the bell crank levers 244 are shifted to the left so that the ends of their arms 245 are in planes between the tappet cam 206 and the snail cam 204 so that they will not be operated by the tappet cams. This shifting of the sliding frame 252 to the right shifts the bell crank levers 227 so that their arms 228 will lie in the plane between the tappet cam 205 and the snail cam 203 and at the same time shifts the bell crank levers 244 so that the ends of their arms 245 will be in the plane of movement of the tappet cams 206. This shifting of the sliding frame 252 is arranged to take place before the shifting of the swinging frame 247 as will be hereinafter described.

The power mechanism (see Figs. 4$^d$, 5$^b$, 15 and 16) here shown comprises a driving spring secured at one end to a sleeve 256 carried by a shaft 257 and at the other end secured to a drum 258 carried by the shaft 257 and provided with gear 259 which through pinion 260 and gear 261 on shaft 262 drives the gear 99 which drives the sleeve 97. The power mechanism also comprises a winding spring secured at one end to shaft 264 and at the other end to drum 265 carried by sleeve 266 mounted on the shaft and provided with gear 267 which is in mesh with pinion 268 on the sleeve 256 of the driving spring. On the outer end of the shaft 264 outside the side piece of the frame 7 is a pinion 269 which is in mesh with a segment 270 carried by a rock shaft 271 and provided with a handle 272 by which it may be swung on its pivot to rotate the pinion 269 and the shaft 266 to wind up the winding spring which in turn through the drum 265 and its gear 267 winds up the driving spring at regular intervals. On a short sleeve 273 fast on the shaft 264 is a ratchet wheel 274 with which engages a detent pawl 275 pivoted on the side piece of the frame to hold the shaft 264 from rotating backward.

The pinion 269 with which the segment 270 is in mesh is loose on the shaft 264 and is provided with a spring pawl 276 which engages the teeth of a ratchet 277 fixed on shaft 264 when the gear 269 is driven in the direction to wind the winding spring and slips over the teeth when the segment is being returned to initial position.

The shaft 264 is provided to the left of the drum 265 with a ratchet 278 fixed to it, with which a locking dog 279 is adapted to engage to hold the shaft against rotation in a direction to wind up the winding spring except at the proper time for winding. This locking dog 279 is held in locked engagement with the ratchet 278 by a cam 290 on a slide 281. So long as the slide 281 remains in its rearward position, as shown in Fig. 5$^b$, the cam 290 will be in contact with the tail of the dog 279 holding its forward end in engagement with the ratchet 278 thus preventing the shaft 264 to be rotated to wind the winding spring. When the slide 281 is moved to its forward position, as hereinafter described, the cam 290 passes out from beneath the tail of the dog 279 and the forward end of the dog is withdrawn from engagement with the ratchet 278 by its spring 279' leaving the shaft 264 free to be rotated to wind the spring through the segment 270.

The shaft 271 on which the segment 270 is carried is provided with a full stroke ratchet 282 with which a spring detent pawl 283 is adapted to engage during the winding operation. The spring detent 283 is provided on its under side forward of its pivot with a roller 284 with which a cam 285 on the rear end of a projection 286 on the upper edge of the slide 281 engages when the slide is in rearward position, to hold the end of the detent pawl up out of engagement with the ratchet 282. The ratchet 282 is provided with an arm 287 so arranged that as the segment 270 completes the swing necessary to wind up the winding spring the arm will strike the forward end of the projection 286 and force the slide 281 rearward to bring the cam 285 on the rear end of the projection 286 against the roller 284 to lift the end of the spring detent 283 out of engagement with the teeth of the ratchet 282, at the same time bringing the cam 280 under the rear end of the pawl 275 locking it against movement. A spring 288 on the shaft 271 acts to return the shaft and the segment 270 to initial position when the handle is released. A spring 289 connected to a lug 290 on the lower edge of the slide 281 tends to draw it forward and a spring dog 291 by the engagement of its free end with a lug 292 on the under side of the slide holds it normally in its rearward position. The dog 291 has near its free end a laterally bent finger 293.

The calculating mechanism is driven by the driving spring the winding spring being locked, until the gear 259 connected with the drum of the driving spring has completed one complete rotation when the winding spring is unlocked and rotates the gear 267 through one fifth of a rotation which winds up the driving spring, the driving spring being then again locked. For the purpose of effecting the unlocking of the winding spring to effect the rewinding of the driving spring the gear 267 is provided with a disk 294 having five ratchet teeth 295 at equal distances apart, the one which is at the time below the center of the disk being normally engaged by a tooth 296 on the end of the lever 297 pivoted at its rear end on a shaft 298 near the bottom of the frame and normally pressed upward by a spring 299. A lever 300 pivoted at its rear end on a rod 301 and extending forward to a point directly above the shaft 257 of the driving spring has its forward end provided with a roller 302 to engage a snail cam 303 fixed on the shaft 257 and the lever also has a depending arm 304 having a finger 305 pivoted to its lower end and normally in line with the arm and adapted to engage a pin 307 on the lever 297 to force it downward to disengage the tooth 296 from the tooth 295 of the disk 294 to permit the gear 267 to rotate. As soon as the tooth 296 has been disengaged and the tooth 295 has passed it, the pivoted finger 305 swings on its pivot releasing the lever 297 so that its free end is raised by the spring 299 to bring the tooth 296 in position to catch the next tooth 295 of the disk 294 thus permitting the disk and the gear 267 to turn one fifth of a rotation only. The lever 297 will move downward to effect the release of the winding gear only when the highest point of the snail cam 303 passes out from under the roller 302.

The winding drum 265 is provided on its periphery with a pin 308 which as the winding drum completes a rotation strikes the laterally bent finger 293 of the dog 291 forcing the free end of the dog downward to disengage it from the lug 292 on the lower edge of the slide 281 thus releasing the slide and permiting it to move forward under the influence of the spring 289 carrying the cam 280 from under the rear end of the spring pawl 249 thus unlocking the shaft 264 to permit it to be rotated by the segment 270 this movement of the slide also carrying the projection 286 away from beneath the roller 284 of the spring detent 283 permitting the detent to drop into engagement with the teeth of the full stroke ratchet 282 on the shaft 271 of the segment 270. The forward movement of the slide also releases the bell hammer 309 and permits it to strike the bell 310 to notify the operator that the winding spring should be wound up. In order that any work on which the operator may be engaged when the winding drum completes a rotation, may be completed, the driving gear 259 is permitted to continue its rotation under the influence of the driving spring for a portion of a rotation and is then stopped. The stopping of the driving gear 259 is effected by swinging a rearwardly extending arm 313 on a bell crank lever 306 so that the roller 312 carried on its end will be in the path of a stop 311 carried by the driving gear. The bell crank lever 306 is pivoted at 315 on a bail 317 and has its other arm 316 extending to the left and provided at its end with a cam end 276 which is in the path of a projection 314 on an upward extension on the forward end of the slide 281. A spring 277 holds the bell crank lever in such position that the roller 312 on the end of the arm 313 will be out of the path of the lug 311. The bail 317 is pivoted at 318 on the side pieces 394 and 395 of the frame and is provided with an upwardly extending portion 319 adapted, when the bail is swung, to be brought under projections 320 on the numeral keys so as to prevent them from being depressed. When the slide 281 is released upon the completion of a rotation by the winding drum, and is drawn forward by the action of the spring 289 the projection 314 strikes the cam end 276 of the arm 316 of the bell crank lever 306 swinging it on its pivot against the force of the spring 277 and swinging the arm 313 so as to bring its roller 312 into the path of the lug 311. As the driving gear continues to rotate the lug 311 is brought against the roller 312 forcing the arm forward and swinging the bail 317 on its pivots 318 to bring its upwardly extending portion 319 in line with the projections 320 on the numeral keys thus locking the machine against further operation until the segment 270 is operated to wind up the winding spring and restore the slide 281 to its rearward position. As the slide returns to its rearward position the projection 314 is carried away from contact with the cam end 276 permitting the bell crank lever to be swung on its pivot by the spring 277 swinging arm 313 so as to move its roller 312 laterally away from the stop 311. The bail 317 is also provided with a forwardly extending arm 321 (see Fig. 10) which extends beneath the rear end of a lever 322 pivoted at 323 and having its forward end provided with a roller 324 in the path of a cam 325 carried by the swinging frame 247 so that as the swinging frame is shifted it will cause the numeral keys to be locked against operation so that they can be operated only when the swinging frame has completed its movement to set the calculating mechanism for either adding or subtracting.

The movement of the swinging frame 247 to set the calculating mechanism for either addition or subtraction as may be desired, is effected by means of a shifting lever 326 formed by bending upward the right hand end of an extension 327 of the swinging frame in line with the upper bail 250. This shifting lever 326 is provided at its upper end with a hand piece 328 pivoted to its upper end and bent around so as to inclose the upper end of the shifting lever, the portion 329 on the left of the shifting lever has its lower end forked to fit over the upper end of a short lever 330 which is pivoted to the shifting lever and has its lowest end engaging the slotted right hand end of a horizontal lever 332 pivoted on the extension 327. The left hand end of this horizontal lever 332 is provided with notches 334 and 335 with which a spring tooth 336 carried by the extension 327 is adapted to engage. The horizontal lever 332 has also rearwardly extending arms 337 and 338 provided respectively with rollers 339 and 340 which engage between them an arm 341 carried by a slide 333 which is mounted to reciprocate on a support 414 of the frame 410. The slide 333 has a forwardly extending arm 349, the forward end of which has a pivotal engagement with the reversing lever 342 which is pivoted at its rear end on the support 414 and has its forward end engaging a collar 343 carried by the sleeve 109 of the reversing gears 107, 108. The slide 333 has also secured to it arm 255 on the right hand end of the sliding frame 252. The hand piece 328 is provided below its pivot with an arm 344 carrying at its lower end a pin 345 which extends into a slot formed between the inner ends of the arms 347 and 348 of a double armed locking dog which is pivoted on the shifting lever 326 below the horizontal lever 332. The arms 347 and 348 of this double armed dog have hooked ends 350 and 351 respectively adapted to engage stops 352 and 353 secured to a fixed portion of the frame. In operating the shifting lever the hand piece 328 is pushed in the desired direction. The first effect of the movement of the hand piece is to swing it on its pivot independently of the shifting lever and, through the action of the forked end of its portion 329 on the lever 330, to cause the horizontal lever 332 to swing on its pivot and, through its arms 337 and 338, to cause the lever 342 to shift the bevel gears 107 and 108 and at the same time to shift the sliding frame 252 to cause, through its fingers 254, the bell crank levers 227 and 238 to be shifted with reference to the tappet cams 205 and 206 and also through the pin 345 on the arm 344 to swing the double armed dog to disengage the hooked end of its arm 347 from the stop 352 thus unlocking the shifting lever. The further movement of the hand piece 328 carries the shifting lever 326 with it to swing the bail 250 of the swinging frame 247 against the arms 225 of the levers 223 and the arms 218 of the carrying levers 209, to raise the carrying pawls 213 out of engagement with the teeth 40 of the clutch gears 38 and to release the other carrying levers to permit their carrying pawls to be brought into contact with the teeth 40. As the shifting lever completes its movement the spring tooth 336 engages the notch 335 in the end of the horizontal lever 332 and at the same time the hooked end 351 of the arm 348 of the double armed dog engages the stop 353 locking the shifting lever. In order to clear the index wheels for the next adding or subtracting operation, that is to reset the index wheels to zero it is only necessary, when the result is to be printed at the foot of the column, to move the shifting lever 326 in the direction to reverse the position of the swinging frame 247 so that, if a column has been added the number printed will be subtracted thus bringing the index wheels to zero. In case a wrong total is printed the index wheels will not return to zero but will show the amount of the error.

In the foregoing description only one calculating mechanism has been described, with the mechanisms for operating it to add or subtract as desired. The machine is however provided with a second set of index wheels located at the front of the frame 7 at the left and adapted to be used either to add or subtract numbers printed by the typewriting machine in a second column separate from the column in which the numbers are to be added or subtracted by the set of index wheels already described, or to separately add the numbers which are added by the set of index wheels already described, as for instance when it is desired to show the total amounts of all bills made out during the day on one set of index wheels, and to show the sum of the items of each bill as written, on the other set, or to add numbers on one set of index wheels and to subtract them on the other set. The second set of index wheels is a duplicate in all respects of the set already described so far as the mounting of the index wheels in the fixed plates 35, the upper and lower locking pawls, carrying levers and means for shifting them and need not be described in detail. The selector 354 for the left hand set of index wheels is the same as the selector 31 used with the right hand set of index wheels and is shifted longitudinally by the same mechanism by which the selector of the right hand set is shifted and the means for clutching the index wheels to the rotary shaft, and the devices for effecting the clutching are also identical. The selector 354 is, however, arranged to rotate in the opposite direction from that in which the selector 31 rotates, and the rotary shaft 355 which carries the sliding clutch members 41 for the left hand set of index wheels while in line with shaft 33 of the right hand device, and driven by it, is separate from it and is arranged to be capable of being rotated, either in the same direction with it or in the opposite direction, through gearing arranged between the two sets of index wheels capable of being shifted to connect up the left hand end of shaft 33 with the right hand end of shaft 355 (see Figs. 3ª, 4ª, 12 and 48).

The left hand shifting lever 356 of the left hand shifting device is substantially identical in construction and arrangement of connected parts as the shifting device at the right hand side of the machine except that the means for shifting the reversing gears for the shaft 354 is arranged to be operated through the sliding frame 357 which corresponds in construction and arrangement with the sliding frame 252 of the left hand calculating mechanism except that it is provided at its left hand end with a forked lug 358 in which is received the rear end of a lever 359 pivoted at 360 having its forward end engaging a collar 361 on a sleeve 362 mounted to slide on the right hand end of shaft 355 and carrying a gear 363 pivoted with pins 364. Shaft 33 is provided on its left hand end with a gear 365 provided with a series of holes to receive pins 364. Gear 365 is in mesh with a gear 366 on a stub axle 367 which is in mesh with a gear 368 on a sleeve 369 on stub shaft 370, the sleeve 369 carrying also gear 371. The sleeve 362 when moved in one direction will bring the pins 364 of its gear 365 into engagement with the holes in gear 365. So arranged the shaft 33 will, through the engagement of the pins 364 with the holes in gear 365, rotate gear 363 thus causing shaft 365 to rotate in the same direction with shaft 33. When collar 362 is shifted in the other direction its gear 363 will be brought into mesh with gear 371. So arranged the shaft 33 will through gear 365 drive gear 366 which will drive gear 368 and with it gear 371 which will, through gear 363, drive shaft 355 in the opposite direction from that in which shaft 33 rotates.

As above stated the selector 354 is arranged to rotate in the opposite direction from selector 31. Its rotation is effected through rack bar 24 which is provided on its forward end with teeth 372 which are in mesh with gear 373 mounted on fixed rod 28 (see Figs. 3ª, 4ª and 13). Gear 373 is in mesh with pinion 374 on short shaft 375 journaled in bearings in the frame above the selector shaft 30, and provided on its right hand end with a gear 376 which is in mesh with a gear 377 on the left hand end of the sleeve 378 on which selector 354 is carried, the sleeve 378 being free to rotate on the selector shaft 30. At its right hand end the sleeve 378 is provided with a collar 379 corresponding to and adjacent the collar 84 on the sleeve 32 carrying the selector 31, the two collars being embraced by the forked end of the arm 83 of the rock shaft 82 so that both of the selectors will be shifted together longitudinally of the shaft 30.

As above stated, the rack bar 24 is provided with teeth in mesh with pinion 23 on the lower end of sleeve 18 and pinion 22 on the upper end of sleeve 18 is in mesh with the teeth 16 on the left hand end of slide rod 15 so that as slide rod 15 moves to the left the selector 354 of the left hand calculating mechanism will be caused to rotate to bring one of its pins 50 into position in line with the finger 47 of one of the bell crank levers 45. The movement of the slide rod 15 is controlled by the movement of the paper carriage of the typewriting machine in the same way that the movement of slide rod 14 is controlled and by mechanism substantially identical in construction and arrangement with that by which that slide rod is released and its movement controlled. For the purpose of releasing and controlling the movement of the slide rod 15 the back plate 167 of the plate 165 of the tripping device 6 is provided with pins 380 on which is carried a vertically movable cam plate 381 corresponding to cam plate 171 carried on the front of plate 165, and provided with downwardly extending cam projections 382 and 383 corresponding with the cams 172 and 173 of cam plate 171. The cam plate 381 is provided on its upper edge midway between its ends with an upwardly extending cam 384 adapted to be acted on by an arm 385 carried by a rock shaft 386 which extends through to the front of the plate and is provided on the front of the plate with a lever 387, the rack bar 4 being slotted as shown to permit the rock shaft 386 to pass through without interfering with the adjustment of the tripping device on the rack bar. An arm of spring 175 serves to hold the cam plate 381 normally in raised position. The lever 387 extends to the left while the lever 179 extends to the right.

The slide rod 16 is provided with a plate 388 corresponding to the plate 180 carried by slide rod 14 extending upward through slot 181 in the top of box or frame 13 and carrying above the top of the box or frame a pivoted dog 389 corresponding in construction with the pivoted dog 182. The dog 389 has at its forward or left hand end, viewed from the front of the machine, a cam 390 on its upper side and a forwardly projecting finger 391 below the cam 390 for engaging the guide bar 185. At its rear end the pivoted dog has a rearwardly extending finger 392 adapted to be engaged by the cam projection 383 of the cam plate 381, and a cam 393 adapted to engage the lug 188 on the bar or frame 13. The action of the cams 382 and 383 on the pivoted dog 389 when the cam plate 381 is in depressed position is precisely the same as that of the cams 172 and 173 of the cam plate 171 on the pivoted dog 182 and need not be further explained.

In Figs. 26ª and 26ᵇ two tripping devices 6 are shown on the rack bar 4. In case the machine is to be employed to add two columns of figures separately on the left hand and right hand sets of index wheels, the lever 179 of the left hand tripping device will be pressed down to depress the cam plate 171 so that the dog 182 will be tripped to cause the slide rod 14 to move with the carriage when the carriage reaches the predetermined point in its movement at which the numbers of the first column are to be typewritten and the lever 387 of the second or right hand tripping device will be pressed down to depress the cam plate 381 so that it will trip the dog 389 at the proper point to release the slide rod 15 to permit it to move to the left with the carriage. If preferred the left hand tripping device may be set to trip the dog 389 to release rod 15 and the right hand tripping device set to trip the dog 182. If desired, either of the tripping devices may be set to trip both dogs at the same time thus causing both selectors to rotate at the same time so that the numbers typewritten may be added simultaneously as where one set of index wheels is to be used for the totals of separate bills or ledger accounts and the other for the aggregate total of all the bills or ledger accounts or so that one set of index wheels may be used to add the numbers and the other to subtract the numbers from a predetermined total.

By the arrangement of the studs 50 and cam pins 51 on the selector 31 (and the same is true also of the studs and cam pins of selector 354) as shown it is made possible to write in the decimal point and the commas used for pointing off the numbers into periods of three figures each, or the commas alone where the decimal point is not desired, without disturbing the selection, as the carriage moves toward the left, of the proper index wheel. For this purpose the selector is provided at certain points with pairs of studs and pairs of cam pins so that as the selector is brought into position to be shifted to select the proper index wheel and the period key or comma key instead of a numeral key is struck to print a period or comma, by which the carriage is released to advance one step and the selector correspondingly rotated one step, the second stud of the pair will be brought into proper position to operate the clutching device of the same index wheel upon the striking of a numeral key and the consequent shifting of the selector, which would have been clutched to the shaft 33 if a numeral key had been previously struck instead of the period or comma key.

For the purpose of making clear the arrangement and operation of the studs and pins of the selector attention is directed to Fig. 3$^b$. As the selector 31 is shown in this view its first movement after the dog 182 has been tripped will be to bring the stud 50$^a$ in line with the finger 47 of the index wheel of the highest denomination which in the machine shown, if dollars and cents are to be written, would be in millions place. On the depression of the proper numeral key the selector is shifted to the right bringing stud 50$^a$ against the finger 47 and causing the millions index wheel to be clutched to the shaft 33 and the master wheel to be unlocked to permit shaft 33 to be rotated to indicate the figure typewritten. After the millions figure, counting from left to right, a comma should be printed. As the numeral key already operated is released the carriage advances one step and the selector rotates one step, and upon the striking of the comma key and its release, the carriage advances one step and the selector rotates one step. This brings stud 50$^c$ in line with the finger 47 of the second index wheel counting from the left, that is the hundred thousand wheel, and upon the depression of a numeral key the figure printed is shown on this index wheel and on releasing the key struck, the carriage moves forward one step and the selector rotates one step bringing stud 50$^d$ in line with the finger 47 of the third or ten thousand index wheel and on the depression of the proper numeral key the selector will be shifted and the index wheel clutched and rotated. On the release of the key and the advance of the carriage the selector is rotated to bring stud 50$^e$ in line with the finger 47 of the fourth or thousand index wheel, and on the depression of the proper numeral key this index wheel is rotated, and on the release of the key and the advance of the carriage, as the next key to be struck is the comma key and not a numeral key, the rotation of the selector brings stud 50$^f$ in line with the finger 47 of the index wheel last operated, that is the thousand wheel. Upon the depression of the comma key and its release the selector is rotated to bring stud 50$^g$ in line with the finger 47 of the hundreds index wheel and as numeral keys are successively struck to print the figures in the hundreds, tens and units places the studs 50$^h$, 50$^i$ and 50$^j$ are brought successively in line with the fingers 47 through which the several index wheels for the tens, units and first decimal place are clutched to the shaft 33. As the period is to be printed after the unit figure has been printed and registered, the stud 50$^j$ being in line with the finger 47 of the first decimal place wheel, the period key is depressed printing the period and on its release the selector is rotated to bring the stud 50$^k$ in line with the finger 47 of the same first decimal place index wheel so that on the depression of the proper key to print the figure in the first decimal place the first decimal place index wheel will be clutched to the shaft and rotated. It will of course be understood that depression of the comma key or period key, or depression of the naught or zero key will not cause the shifting of the selecfor longitudinally of its shaft 30 or the release of the power mechanism, this being capable of being effected only by one of the nine numeral keys.

If it is desired to print numbers without the decimal point the selector will operate to permit the printing of the commas for pointing off. In such case the first or left hand index wheel of the nine usually used will be hundred millions wheel and no comma is to be written until after the third or millions wheel has been rotated, and the space key is operated to permit the carriage to advance one step after the dog 182 has been tripped. This permits the selector to rotate one step so as to bring stud $50^b$ into line with finger 47 of the hundred millions index wheel and as the numeral keys are successively depressed to print successively the figures in the hundred millions, ten millions, and millions places, studs $50^c$ and $50^d$, are brought in line with the fingers 47 of the index wheels for the ten millions wheel and the millions wheel respectively and the stud $50^e$ is brought in line with the finger 47 of the hundred thousand index wheel. The comma being now to be printed the comma key is struck and released the selector being rotated one step bringing stud $50^f$ in line with the finger 47 of the hundred thousand wheel so that as the proper numeral key is depressed and the selector shifted, the hundred thousand wheel will be clutched to shaft 33 through the action of the stud $50^f$. As the numeral keys are successively operated to print successively the figures in the hundred thousand, ten thousand and thousands index wheels, the studs $50^g$, $50^h$, and $50^i$ are brought into line with the fingers 47 of the index wheels of the ten thousands, thousands and hundreds index wheels. On the operation of the comma key to print a comma after the thousands the selector is permitted to rotate to bring stud $50^j$ in line with the finger 47 of the hundreds index wheel so that on the depression of a numeral key to print the figure in hundreds place the hundreds index wheel will be clutched to the shaft 33 and rotated, and on the release of the key and the operation of the proper key for the printing of the figure in tens place, the studs $50^k$ and $50^l$ will be brought in line with the fingers 47 of the index wheels for the tens and units.

It will of course be understood that while only nine index wheels are shown in each of the two sets, a larger number may be used if required and it will also be understood that as the selector is rotated one of the cam pins 51 will be brought in contact with the finger 48 of the bell crank lever 45 last operated so as to return it to normal position and withdraw the sliding clutch member if it is not already withdrawn by the action of the springs 54 and 55 through the locking pawls and the lever 58 on the finger 49.

The frame 7 is made up of side pieces 394 and 395, back piece 396 connecting the rear ends of the side pieces and rods 67, 68, 69 above referred to, and rods 397, 398, 399, 400, and 401 in the forward portion and rods 402 and 403 in the rear portion of the machine connecting the two side pieces to form with them a rigid frame on which the mechanism is supported. The rods 67, 68 and 69 serve to support the vertical plates 70 as above stated. The rods 397, 398 and 399 serve to support the fixed plates 35 and also a vertical plate 405 parallel with the fixed plates near the left hand side of the machine which serves to support a bearing plate 406 in which the shafts 30 and 375 have their bearings. The rods 400, 401, 402 and 403 serve to support a vertical plate 404 parallel with the side plate in which the left hand ends of the shafts 257, 264 and 271 are journaled the right hand ends of these shafts being journaled in the side plate 294. The plate 404 also supports the left hand end of rods 298 and 301 the other ends of which are supported in the side piece 394. The plate 404 also supports the slide 281 and the pawls 279 and 284.

The master wheel and controlling mechanism and the shifting lever and its connected mechanism are carried on a supplemental frame 407 (shown in detail in Fig. 52) preferably formed in a single piece with portions bent into suitable shape to support the several parts of the mechanisms referred to. This frame 407 has on its forward portion downwardly bent lugs 408, 409 adapted to fit upon the fixed rod 68, the rear portion of the supplemental frame resting on the rod 69. On the forward portion of this supplemental frame is carried a frame 410 (see Fig. 6) which has in front and rear respectively upwardly bent arms 411 and 412 in which the shaft 105 has its bearings, the frame 410 also having its left hand side portion bent upward and over into parallelism with the base to form a horizontal shelf 413 which carries at its rear end a support 414 on which the lever 342 is pivoted and having its right hand side portion bent upward to support the pivot of the shifting lever 326. Carried by the rear portion of the supplemental frame 407 is an upright 415 (see Figs. 36, 38 and 40) for supporting the slide 146. The upright 415 has a portion 416 bent at right angles so as to afford a firm support on the frame 407. The upper portion of this upright is formed with a horizontal edge 417 on which the slide 146 reciprocates and overhanging ends 418 to guard the slide against displacement.

A cover plate 419 extends over the top of the machine and down over the front and being provided with suitable apertures through which the index wheels may be seen and also suitable apertures for the shifting levers 326 and 356.

When it is desired to disassemble the parts, the side piece 394 is removed and the supplemental frame slipped off the fixed rod 68.

It will be noted that many of the movements necessary to the operation of the mechanism above described are effected by springs but in practically all cases the proper operation of the mechanism is insured by positively acting devices which if the springs do not act quickly enough will cause the proper operation.

Having thus described my invention what I claim is:

1. In a calculating machine, a group of index wheels, means normally disconnected from the index wheels for rotating them, separate connecting devices for connecting each of the index wheels to the rotating means, a selector provided with studs adapted to operate the connecting devices, means for moving the selector to bring a stud into position to operate a connecting device, means for shifting the selector to cause the stud to operate the connecting device, means for operating the rotating means to rotate the index wheel so connected through a predetermined movement of rotation, means for returning the selector to the position from which it was shifted to release the connecting means, spring devices for returning the connecting device operated to normal position to disconnect the index wheel operated, from the rotating means, and means carried by the selector operating on its return movement for positively actuating the connecting device to disconnect the index wheel operated, from the rotating means.

2. In a calculating machine, a group of index wheels, means normally disconnected from the index wheels for rotating them, separate connecting devices for connecting each of the index wheels to the rotating means, a rotary selector provided with studs adapted to operate the connecting devices, means for rotating the selector to bring a stud into position to operate a connecting device, means for shifting the selector longitudinally of its axis to cause the stud to operate the connecting device, means for operating the rotating means to rotate the index wheel so connected through a predetermined movement of rotation, means for returning the selector to the position from which it was shifted to release the connecting means, spring devices for returning the connecting device operated to normal position to disconnect the index wheel operated, from the rotating means, and means carried by the selector operating on its return movement for positively actuating the connecting device to disconnect the index wheel operated from the rotating means.

3. In a calculating machine, a group of index wheels, means normally disconnected from the index wheels for rotating them, separate connecting devices for connecting each of the index wheels to the rotating means, a selector provided with a series of studs for operating the connecting devices, the studs being so arranged that only one of them at a time can be brought in position to operate a connecting device, means for moving the selector to bring a stud into position to operate a connecting device, means for shifting the selector to cause the stud to operate the connecting device, means for operating the rotating means to rotate the index wheel so connected through a predetermined movement of rotation, means for returning the selector to the position from which it was shifted to release the connecting means, spring devices for returning the connecting device operated to normal position to disconnect the index wheel operated, from the rotating means, and means carried by the selector operating on its return movement for positively actuating the connecting device to disconnect the index wheel operated from the rotating means.

4. In a calculating machine a group of index wheels, means normally disconnected from the index wheels for rotating them, separate connecting devices for connecting each of the index wheels to the rotating means, a rotary selector provided with studs adapted to operate the connecting devices, the studs being so arranged that any one of them at a time can be brought in position to operate a connecting device, means for rotating the selector to bring a stud into position to operate a connecting device, means for shifting the selector longitudinally of its axis to cause the stud to operate the connecting device, means for operating the rotating means to rotate the index wheel so connected through a predetermined movement of rotation, means for returning the selector to the position from which it was shifted to release the connecting means, spring devices for returning the connecting device operated to normal position to disconnect the index wheel operated, from the rotating means, and means carried by the selector operating on its return movement for positively actuating the connecting device to disconnect the index wheel operated from the rotating means.

5. In a calculating machine, a group of index wheels arranged in line, means normally disconnected from the index wheels for rotating them, separate connecting devices for connecting each of the index wheels to the rotating means, also arranged in line, a rotary selector having its axis parallel with the line of the connecting devices provided on its periphery with a spirally arranged series of studs each adapted to operate one of the connecting devices, means for rotating the selector to successively bring the studs into position to operate the connecting devices of the several index wheels, means for shifting the selector longitudinally of its axis to operate the connecting device, means for operating the rotating means to rotate the index wheel so connected through a predetermined movement of rotation, means for returning the selector to the position from which it was shifted to release the connecting means, spring devices for returning the connecting device operated to normal position to disconnect the index wheel operated, from the rotating means, and means carried by the selector operating on its return movement for positively actuating the connecting device to disconnect the index wheel operated from the rotating means.

6. In a calculating machine, a series of fixed plates supported by the frame of the machine, a group of hollow index wheels arranged in line each having an external bearing in one of said fixed plates, and each being provided with a clutch member having clutch teeth on its interior, a rotary shaft extending through the group of index wheels and adapted to rotate freely therein, sliding clutch members one for each index wheel carried by the rotary shaft and adapted to engage the clutch teeth of the clutch members of the index wheels, means for moving the sliding clutch members one at a time into engagement with the clutch teeth of the clutch members carried by the index wheels, and means for imparting to the shaft a predetermined movement of rotation, spring actuated means for disengaging the clutch members on the completion of the movement of rotation, positively operating means for insuring the disengagement of the clutch members, and means for actuating the positively operating means in advance of the movement of a second sliding clutch member.

7. In a calculating machine, a group of index wheels, means normally disconnected from the index wheels for rotating them, separate connecting devices for connecting each of the index wheels to the rotating means, a selector provided with studs adapted to operate the connecting devices, means for moving the selector to bring a stud into position to operate a connecting device, means for shifting the selector to cause the stud to operate the connecting device, means for returning the selector to normal position, and means carried by the selector operating on its return movement for operating the connecting devices to disconnect the index wheels from the rotating means.

8. In a calculating machine, a group of index wheels, means normally disconnected from the index wheels for rotating them, separate connecting devices for connecting each of the index wheels to the rotating means, a rotary selector provided with studs adapted to operate the connecting devices, means for rotating the selector to bring a stud into position to operate a connecting device, means for shifting the selector longitudinally of its axis to cause the stud to operate the connecting device, means for returning the selector to normal position, and means carried by the selector operating on its return movement for operating the connecting devices to disconnect the index wheels from the rotating means.

9. In a calculating machine, a group of index wheels, means normally disconnected from the index wheels for rotating them, separate connecting devices for connecting each of the index wheels to the rotating means, a selector provided with a series of studs for operating the connecting devices, the studs being so arranged that only one of them at a time can be brought in position to operate a connecting device, means for moving the selector to bring a stud into position to operate a connecting device, means for shifting the selector to cause the stud to operate the connecting device, means for returning the selector to normal position, and means carried by the selector operating on its return movement for operating the connecting devices to disconnect the index wheels from the rotating means.

10. In a calculating machine, a group of index wheels, means normally diconnected from the index wheels for rotating them, separate connecting devices for connecting each of the index wheels to the rotating means, a rotary selector provided with studs adapted to operate the connecting devices, the studs being so arranged that only one of them at a time can be brought in position to operate a connecting device, means for rotating the selector to bring a stud into position to operate a connecting device, means for shifting the selector longitudinally of its axis to cause the stud to operate the connecting device, means for returning the selector to normal position, and means carried by the selector operating on its return movement for operating the connecting devices to disconnect the index wheels from the rotating means.

11. In a calculating machine, a group of index wheels arranged in line, means normally disconnected from the index wheels for rotating them, separate connecting devices for connecting each of the index wheels to the rotating means, also arranged in line, a rotary selector having its axis parallel with the line of the connecting devices provided on its periphery with a spirally arranged series of studs each adapted to operate one of the connecting devices, means for rotating the selector to successively bring the studs into position to operate the connecting devices of the several index wheels, means for shifting the selector longitudinally of its axis to operate the connecting device, means for returning the selector to normal position, and means carried by the selector operating on its return movement for operating the connecting devices to disconnect the index wheels from the rotating means.

12. In a calculating machine, a group of index wheels, means normally disconnected from the index wheels for rotating them, separate connecting devices for connecting each of the index wheels to the rotating means, a selector provided with studs adapted to operate the connecting devices, means for moving the selector to bring a stud into position to operate a connecting device, means for shifting the selector to cause the stud to operate the connecting device, means for operating the rotating means to rotate the index wheel so connected through a predetermined movement of rotation, means for returning the selector to normal position, and means carried by the selector operating on its return movement for operating the connecting devices to disconnect the index wheel from the rotating means on the completion of the predetermined movement of rotation.

13. In a calculating machine, a group of index wheels, means normally disconnected from the index wheels for rotating them, separate connecting devices for connecting each of the index wheels to the rotating means, a rotary selector provided with studs adapted to operate the connecting devices, means for rotating the selector to bring a stud into position to operate a connecting device, means for shifting the selector longitudinally of its axis to cause the stud to operate the connecting device, means for operating the rotating means to rotate the index wheel so connected through a predetermined movement of rotation, means for returning the selector to normal position, and means carried by the selector operating on its return movement for operating the connecting devices to disconnect the index wheel from the rotating means on the completion of the predetermined movement of rotation.

14. In a calculating machine, a group of index wheels, means normally disconnected from the index wheels for rotating them, separate connecting devices for connecting each of the index wheels to the rotating means, a selector provided with a series of studs for operating the connecting devices, the studs being so arranged that only one of them at a time can be brought in position to operate a connecting device, means for moving the selector to bring a stud into position to operate a connecting device, means for shifting the selector to cause the stud to operate the connecting device, means for operating the rotating means to rotate the index wheel so connected through a predetermined movement of rotation, means for returning the selector to normal position, and means carried by the selector operating on its return movement for operating the connecting devices to disconnect the index wheel from the rotating means on the completion of the predetermined movement of rotation.

15. In a calculating machine, a group of index wheels, means normally disconnected from the index wheels for rotating them, separate connecting devices for connecting each of the index wheels to the rotating means, a rotary selector provided with studs adapted to operate the connecting devices, the studs being so arranged that only one of them at a time can be brought in position to operate a connecting device, means for rotating the selector to bring a stud into position to operate a connecting device, means for shifting the selector longitudinally of its axis to cause the stud to operate the connecting device, means for operating the rotating means to rotate the index wheel so connected through a predetermined movement of rotation, means for returning the selector to normal position, and means carried by the selector operating on its return movement for operating the connecting devices to disconnect the index wheel from the rotating means on the completion of the predetermined movement of rotation.

16. In a calculating machine, a group of index wheels arranged in line, means normally disconnected from the index wheels for rotating them, separate connecting devices for connecting each of the index wheels to the rotating means, also arranged in line, a rotary selector having its axis parallel with the line of the connecting devices provided on its periphery with a spirally arranged series of studs each adapted to operate one of the connecting devices, means for rotating the selector to successively bring the studs into position to operate the connecting devices of the several index wheels, means for shifting the selector longitudinally of its axis to operate the connecting device, means for operating the rotating means to rotate the index wheel so connected through a predetermined movement of rotation, means for returning the selector to normal position, and means carried by the selector operating on its return movement for operating the connecting devices to disconnect the index wheel from the rotating means on the completion of the predetermined movement of rotation.

17. The combination with a typewriting machine having a reciprocating carriage, of a calculating machine comprising a group of index wheels, means normally disconnected from the index wheels for rotating them, separate connecting devices for connecting each of the index wheels to the rotating means, a selector provided with means for operating the connecting devices, means controlled by the carriage of the typewriting machine for moving the selector to bring the means for operating the connecting device in position to operate, key operated means for shifting the selector to cause the connecting device to be operated, means for returning the selector to normal position upon the release of the key, spring actuated means for disengaging the connecting means upon the return of the selector to normal position, and positively operating means carried by the selector for insuring the disengagement of the connecting means and operating upon the advance of the carriage of the typewriting machine as the key is released.

18. The combination with a typewriting machine having a reciprocating carriage, of a calculating machine comprising a group of index wheels, means normally disconnected from the index wheels for rotating them, separate connecting devices for connecting each of the index wheels to the rotating means, a rotary selector provided with studs on its periphery for operating the connecting devices, means controlled by the carriage of the typewriting machine for rotating the selector to bring a stud in position to operate the connecting means, key operated means for shifting the selector longitudinally of its axis to cause the connecting device to be operated, means for returning the selector to normal position upon the release of the key, spring actuated means for disengaging the connecting means upon the return of the selector to normal position, and positively operating means carried by the selector for insuring the disengagement of the connecting means and operating upon the advance of the carriage of the typewriting machine as the key is released.

19. The combination with a typewriting machine having a reciprocating carriage, of a calculating machine comprising a group of index wheels, means normally disconnected from the index wheels for rotating them, separate connecting devices for connecting each of the index wheels to the rotating means, a rotary selector provided with studs for operating the connecting devices so arranged that only one of the studs at a time can be brought in contact with an operating device, means controlled by the carriage of the typewriting machine for rotating the selector to bring a stud into position to operate the connecting device, key operated means for shifting the selector longitudinally of its axis to cause the connecting device to be operated, means for returning the selector to normal position upon the release of the key, spring actuated means for disengaging the connecting means upon the return of the selector to normal position, and positively operating means carried by the selector for insuring the disengagement of the connecting means and operating upon the advance of the carriage of the typewriting machine as the key is released.

20. The combination with a typewriting machine having a reciprocating carriage, of a calculating machine comprising a group of index wheels, arranged in line, means normally disconnected from the index wheels for rotating them, separate connecting devices also arranged in line for connecting each of the index wheels to the rotating means, a rotary selector provided with a spirally arranged series of studs for operating the connecting devices, having its axis parallel with the line of the connecting devices, means controlled by the carriage of the typewriting machine for rotating the selector to bring a stud into position to operate the connecting device, key operated means for shifting the selector longitudinally of its axis to cause the connecting device to be operated, means for returning the selector to normal position upon the release of the key, spring actuated means for disengaging the connecting means upon the return of the selector to normal position, and positively operating means carried by the selector for insuring the disengagement of the connecting means and operating upon the advance of the carriage of the typewriting machine as the key is released.

21. The combination with a typewriting machine having a reciprocating carriage, of a calculating machine comprising a group of index wheels, means normally disconnected from the index wheels for rotating them, separate connecting devices for connecting each of the index wheels to the rotating means, a selector provided with means for operating the connecting devices, means controlled by the carriage of the typewriting machine for moving the selector to bring the means for operating the connecting device in position to operate, key operated means for shifting the selector to cause the connecting device to be operated, means for operating the means for rotating the index wheels for a predetermined movement of rotation, means for returning the selector to normal position upon the release of the key, spring actuated means for disengaging the connecting means upon the return of the selector to normal position, and positively operating means carried by the selector for insuring the disengagement of the connecting means and operating upon the advance of the carriage of the typewriting machine as the key is released.

22. The combination with a typewriting machine having a reciprocating carriage, of a calculating machine comprising a group of index wheels, means normally disconnected from the index wheels for rotating them, separate connecting devices for connecting each of the index wheels to the rotating means, a selector provided with means for operating the connecting devices, means controlled by the carriage of the typewriting machine for moving the selector to bring the means for operating the connecting device in position to operate, key operated means for shifting the selector to cause the connecting device to be operated, power mechanism normally locked for actuating the means for rotating the index wheels, controlling means for the power mechanism, means operated by the key for setting the controlling mechanism to permit a predetermined movement of rotation and for releasing the power mechanism, means for returning the selector to normal position upon the release of the key, spring actuated means for disengaging the connecting means upon the return of the selector to normal position, and positively operating means carried by the selector for insuring the disengagement of the connecting means and operating upon the advance of the carriage of the typewriting machine as the key is released.

23. The combination with a typewriting machine having a reciprocating carriage, of a calculating machine comprising a group of index wheels, means normally disconnected from the index wheels for rotating them, separate connecting devices for connecting each of the index wheels to the rotating means, a selector provided with means for operating the connecting devices, means controlled by the carriage of the typewriting machine for moving the selector to bring the means for operating the connecting device in position to operate, key operated means for shifting the selector to cause the connecting device to be operated, power mechanism normally locked for actuating the means for rotating the index wheels, controlling means for the power mechanism, means operated by the key for setting the controlling mechanism to permit a predetermined movement of rotation and for releasing the power mechanism, locking mechanism operated by the controlling mechanism to lock the power mechanism on the completion of the predetermined movement of rotation, means for returning the selector to normal position upon the release of the key, spring actuated means for disengaging the connecting means upon the return of the selector to normal position, and positively operating means carried by the selector for insuring the disengagement of the connecting means and operating upon the advance of the carriage of the typewriting machine as the key is released.

24. In a calculating machine, comprising a series of index wheels, a shaft for rotating the index wheels and power mechanism in gear with the shaft, a carrying lever provided with a pawl for engaging the teeth of a gear on an index wheel of higher denomination, a sleeve carried by a rod parallel with the rotary shaft and driven by a wheel of lower denomination, means operated by said sleeve for swinging the carrying lever to cause its pawl to engage a tooth in rear of the tooth with which it was previously engaged, a spring for causing the carrying lever to move toward the index wheel of higher denomination to effect its movement when released, and means carried by the sleeve for positively moving the carrying lever to effect the movement of the carrying wheel of higher denomination.

25. In a calculating machine for use in connection with a typewriting machine, comprising index wheels, a shaft for rotating the index wheels, and power mechanism for operating the shaft, said power mechanism comprising a driving drum in gear with the shaft for rotating the index wheels, and a winding drum for winding up the driving drum, a lock for the winding drum, a stop for the driving drum and locking means for preventing the operation of the numeral keys, and means normally locked adapted when released to lock the winding drum, to move the stop into position to stop the rotation of the driving drum and to move the locking means into position to prevent the operation of the numeral keys, and means carried by the winding drum for releasing said normally locked means.

26. The combination with a typewriting machine having a reciprocating paper carriage and numeral keys, of a calculating machine comprising index wheels, a shaft for rotating the index wheels normally disconnected therefrom, and power mechanism for operating the shaft, means for selecting the index wheel to be rotated controlled by the carriage of the typewriting machine and arranged to be operated by a numeral key to effect the connection of the index wheel selected with the rotary shaft, a lock for the selecting means arranged to be released by the carriage, locking means normally locking the index wheels against rotation in either direction arranged to be released by the depression of a numeral key, and a lock for the power mechanism arranged to be released by the depression of a numeral key, the numeral keys being normally disconnected from the lock releasing means operated by them and arranged to be connected therewith only upon the release by the carriage, of the lock for the selecting means.

27. In a calculating machine for use in connection with a typewriting machine, a series of index wheels, a shaft for rotating the index wheels, power mechanism for operating the shaft, reversing gears between the power mechanism and the shaft, carrying mechanism adapted to rotate an index wheel of a higher denomination in one direction for adding, carrying mechanism adapted to rotate a wheel of higher denomination in the opposite direction for subtracting, means operated by an index wheel of lower denomination for operating the carrying mechanisms, and means for operating the reversing gears and throwing either one of the carrying mechanisms into position to be operated and simultaneously throwing the other carrying mechanism out of position to be operated.

28. In a calculating machine for use in connection with a typewriting machine, a series of index wheels, a shaft for rotating the index wheels, power mechanism for operating the shaft, reversing gears between the power mechanism and the shaft, carrying mechanism adapted to rotate an index wheel of a higher denomination in one direction for adding, carrying mechanism adapted to rotate a wheel of higher denomination in the opposite direction for subtracting, means operated by an index wheel of lower denomination for operating the carrying mechanisms, and means for operating the reversing gears and throwing either one of the carrying mechanisms into position to be operated and simultaneously throwing the other carrying mechanism out of position to be operated, said means comprising a swinging frame, and means for locking the numeral keys against operation arranged to be operated by the swinging frame.

29. In a calculating machine for use in connection with a typewriting machine, a series of index wheels, a shaft for rotating the index wheels normally disconnected therefrom, means for connecting an index wheel with the shaft and means for rotating the shaft, a second set of index wheels, a second rotary shaft for rotating the second set of index wheels, means for connecting an index wheel of the second set with the second rotary shaft, and gearing connecting the rotary shafts of the two sets of index wheels.

30. In a calculating machine for use in connection with a typewriting machine, a series of index wheels, a shaft for rotating the index wheels normally disconnected therefrom, means for connecting an index wheel with the shaft and means for rotating the shaft, a second set of index wheels, a second rotary shaft for rotating the second set of index wheels, means for connecting an index wheel of the second set with the second rotary shaft, and reversing gearing connecting the rotary shafts of the two sets of index wheels.

31. In a calculating mechanism, the combination of two sets of index wheels, means normally disconnected from the index wheels for rotating them, a key, means operated by the key for simultaneously connecting one index wheel of each set with the rotating means, and means controlled by the key for causing the rotating means to simultaneously rotate both index wheels so connected with the rotating means through a predetermined movement of rotation.

32. In a calculating mechanism, the combination of two sets of index wheels, means normally disconnected from the index wheels for rotating them, a key, means operated by the key for simultaneously connecting one index wheel of each set with the rotating means, means controlled by the key for causing the rotating means to simultaneously rotate both index wheels so connected with the rotating means through a predetermined movement of rotation, and means between a set of index wheels and the rotating means by which the direction of rotation of the index wheels of that set may be reversed.

33. In a calculating mechanism, the combination of two sets of index wheels, means normally disconnected from the index wheels for rotating them, a key, means operated by the key for simultaneously connecting one index wheel of each set with the rotating means, means controlled by the key for causing the rotating means to simultaneously rotate both index wheels so connected with the rotating means through a predetermined movement of rotation, and means for independently reversing the direction of rotation of the sets of index wheels.

34. In a calculating mechanism, the combination of two sets of index wheels, a separate shaft for each set of index wheels normally disconnected from the index wheels for rotating them, means for rotating the shafts, a key, means operated by the key for simultaneously connecting one index wheel of each set with the rotating means, and means controlled by the key for causing the rotating means to simultaneously rotate both index wheels so connected with the rotating means through a predetermined movement of rotation.

35. In a calculating mechanism, the combination of two sets of index wheels, a separate shaft for each set of index wheels, normally disconnected from the index wheels for rotating them, means for rotating the shafts, reversing mechanism between one of the shafts and the rotating means, a key, means operated by the key for simultaneously connecting one index wheel of each set with the rotating means, and means controlled by the key for causing the rotating means to simultaneously rotate both index wheels so connected with the rotating means through a predetermined movement of rotation.

36. In a calculating mechanism, the combination of two sets of index wheels, a separate shaft for each set of index wheels normally disconnected from the index wheels for rotating them, means for rotating the shafts, reversing mechanism between each of the shafts and the rotating means, a key, means operated by the key for simultaneously connecting one index wheel of each set with the rotating means, and means controlled by the key for causing the rotating means to simultaneously rotate both index wheels so connected with the rotating means through a predetermined movement of rotation.

37. In a calculating mechanism, the combination of two sets of index wheels, means normally disconnected from the index wheels for rotating them, means for simultaneously selecting an index wheel of each set, a key, means operated by the key for simultaneously connecting the index wheel selected with the rotating means, and means controlled by the key for causing the rotating means to simultaneously rotate both index wheels so connected with the rotating means through a predetermined movement of rotation.

38. The combination with a typewriting machine having numeral keys of a calculating mechanism comprising two sets of index wheels, means normally disconnected from the index wheels for rotating them, means operated by a numeral key for simultaneously connecting one index wheel of each set with the rotating means, and means controlled by the key for causing the rotating means to simultaneously rotate both index wheels so connected with the rotating means through a predetermined movement of rotation.

39. The combination with a typewriting machine having a reciprocating paper carriage and numeral keys, of two sets of index wheels, means normally disconnected from the index wheels for rotating them, selecting means controlled by the paper carriage for simultaneously selecting an index wheel of each set of index wheels, means operated by a numeral key for simultaneously connecting the selected index wheels and means controlled by the numeral key for causing the rotating means to simultaneously rotate the selected index wheels through a predetermined movement of rotation.

40. In a calculating mechanism, the combination of two sets of index wheels, means normally disconnected from the index wheels for rotating them arranged to rotate the index wheels of the two sets in opposite directions, a key, means operated by the key for simultaneously connecting one index wheel of each set with the rotating means to simultaneously rotate both index wheels so connected with the rotating means, through a predetermined movement of rotation.

41. The combination with a typewriting machine having a reciprocating paper carriage and numeral keys and means for moving the paper carriage step by step in one direction, of a set of index wheels, means normally disconnected from the index wheels for rotating them, selecting means for selecting the index wheel to be rotated, means independent of the carriage moving means for actuating the selecting means arranged to be controlled by the movement of the paper carriage, and means operated by a numeral key for connecting the selected index wheel with the rotating means.

42. The combination with a typewriting machine having a reciprocating paper carriage and numeral keys of a set of index wheels, means normally disconnected from the index wheels for rotating them, means for selecting an index wheel to be rotated controlled by the paper carriage, means independent of the paper carriage for actuating the selecting means, means operated by a numeral key for connecting the selected index wheel with the rotating means.

This specification signed and witnessed this 3rd day of December A. D. 1907.

JOHN T. HOWIESON

In the presence of—
A. V. GREELEY,
R. N. FLINT.